US005657224A

United States Patent [19]
Lonn et al.

[11] Patent Number: 5,657,224
[45] Date of Patent: Aug. 12, 1997

[54] TURF MAINTENANCE VEHICLE DIAGNOSTICS AND PARAMETER CONDITION LOGGER

[75] Inventors: Dana R. Lonn, Minneapolis; Fredrick D. Wucherpfennig, Bloomington; William M. Dunford, Minneapolis, all of Minn.

[73] Assignee: The Toro Company, Minneapolis, Minn.

[21] Appl. No.: 998,429

[22] Filed: Dec. 30, 1992

Related U.S. Application Data

[63] Continuation-in-part of Ser. No. 816,816, Jan. 3, 1992, abandoned.

[51] Int. Cl.$^6$ ............................. G06F 11/30; G08B 29/00
[52] U.S. Cl. .................. 364/424.034; 364/424.04; 364/424.07; 395/326
[58] Field of Search .................. 364/424.04, 424.03, 364/424.07, 424.05, 431.12, 551.01, 554; 395/1.55, 1.56, 275, 325

[56] References Cited

U.S. PATENT DOCUMENTS

| | | | |
|---|---|---|---|
| 1,944,584 | 1/1934 | Stegeman et al. | 56/7 |
| 2,513,309 | 7/1950 | Grobowski et al. | 56/249 |
| 2,523,014 | 9/1950 | Gooch | 56/25.4 |
| 2,588,002 | 3/1952 | Holmes | 56/25 |
| 2,869,309 | 1/1959 | Benson | 56/249 |
| 3,093,946 | 6/1963 | Pitt et al. | 56/20 |
| 3,098,574 | 7/1963 | De Marco | 214/241 |
| 3,177,638 | 4/1965 | Johnson | 56/7 |
| 3,207,244 | 9/1965 | Becker et al. | 130/6.48 |
| 3,401,764 | 9/1968 | Schafer | 180/66 |
| 3,410,063 | 11/1968 | SPeiser | 56/7 |
| 3,429,110 | 2/1969 | Strasel | 56/7 |
| 3,442,068 | 5/1969 | Bulin | 56/20 |
| 3,442,070 | 5/1969 | Batog | 56/21 |
| 3,514,929 | 6/1970 | Cornish et al. | 56/21 |
| 3,589,109 | 6/1971 | Payne | 56/10.2 |
| 3,742,685 | 7/1973 | Lian et al. | 56/7 |
| 3,816,985 | 6/1974 | Sorenson et al. | 56/7 |
| 3,968,630 | 7/1976 | Mitchell | 56/7 |
| 3,999,359 | 12/1976 | Jordan et al. | 56/27.5 |
| 4,192,124 | 3/1980 | Balthes | 56/27.5 |
| 4,258,421 | 3/1981 | Juhasz et al. | 364/426.05 |
| 4,271,402 | 6/1981 | Kastura et al. | 340/52 F |
| 4,296,409 | 10/1981 | Whitaker et al. | 340/684 |
| 4,332,127 | 6/1982 | Staiert et al. | 56/10.2 |
| 4,376,298 | 3/1983 | Sokol et al. | 364/551 |
| 4,430,846 | 2/1984 | Presley et al. | 56/10.2 |
| 4,487,002 | 12/1984 | Kruse et al. | 56/10.2 |
| 4,527,241 | 7/1985 | Sheehan et al. | 364/424 |
| 4,551,801 | 11/1985 | Sokol | 364/424 |
| 4,608,638 | 8/1986 | Tsikos | 364/424.05 |
| 4,616,328 | 10/1986 | Kassay et al. | 364/551 |
| 4,710,757 | 12/1987 | Haase | 340/684 |
| 4,794,548 | 12/1988 | Lynch et al. | 364/550 |
| 4,853,856 | 8/1989 | Hanway | 364/424.01 |

(List continued on next page.)

FOREIGN PATENT DOCUMENTS

| | | |
|---|---|---|
| 377163 | 11/1990 | European Pat. Off. |
| 2075684 | 10/1971 | France . |
| 2178669 | 11/1973 | France . |
| 424031 | 2/1935 | United Kingdom . |
| 1375827 | 11/1974 | United Kingdom . |

OTHER PUBLICATIONS

Reelmaster® 223–D Operator's Manual (1991).
Reelmaster® 223–D Brochure (1990).

*Primary Examiner*—Kevin J. Teska
*Assistant Examiner*—Tan Nguyen
*Attorney, Agent, or Firm*—Merchant, Gould, Smith, Edell, Welter & Schmidt, P.A.

[57] ABSTRACT

The present invention provides for a turf maintenance vehicle controller which includes data logger means to store the status of predetermined parameters. The invention further includes the ability to provide such data in real time to an inexpensive diagnostic apparatus and to store the data for concurrent or later analysis by either the diagnostic apparatus or a remote microprocessor.

23 Claims, 19 Drawing Sheets

U.S. PATENT DOCUMENTS

| | | | |
|---|---|---|---|
| 4,878,338 | 11/1989 | Aldred et al. | 56/7 |
| 4,926,331 | 5/1990 | Windle et al. | 364/424.04 |
| 4,967,544 | 11/1990 | Ziegler et al. | 56/10.2 |
| 5,042,236 | 8/1991 | Lamusga et al. | 56/7 |
| 5,046,007 | 9/1991 | McCrery et al. | 364/424.04 |
| 5,173,856 | 12/1992 | Purnell et al. | 364/424.04 |
| 5,185,700 | 2/1993 | Bezos et al. | 364/424.04 |
| 5,195,612 | 3/1993 | Hahn et al. | 184/6.4 |
| 5,255,208 | 10/1993 | Thakore et al. | 364/551.01 |

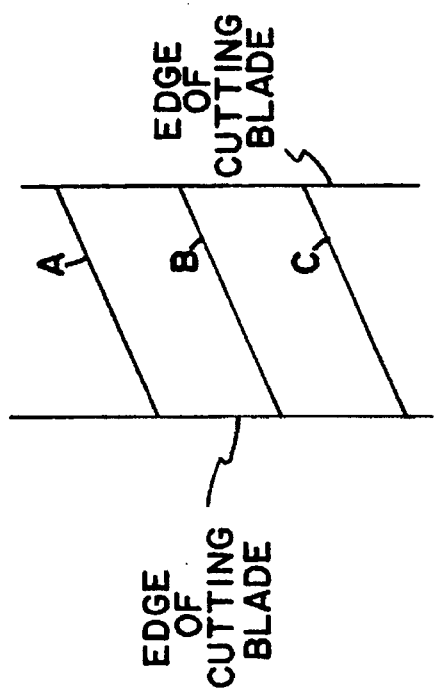
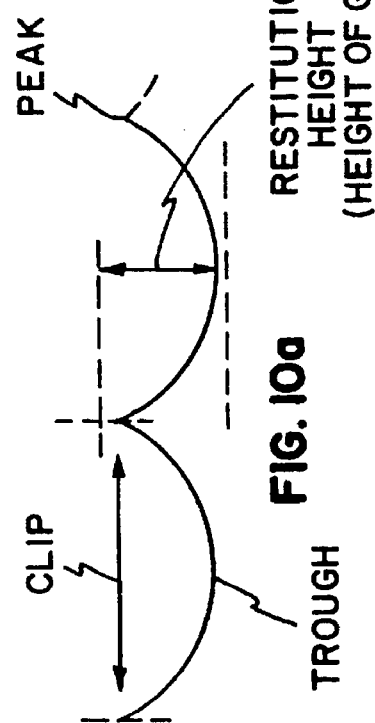
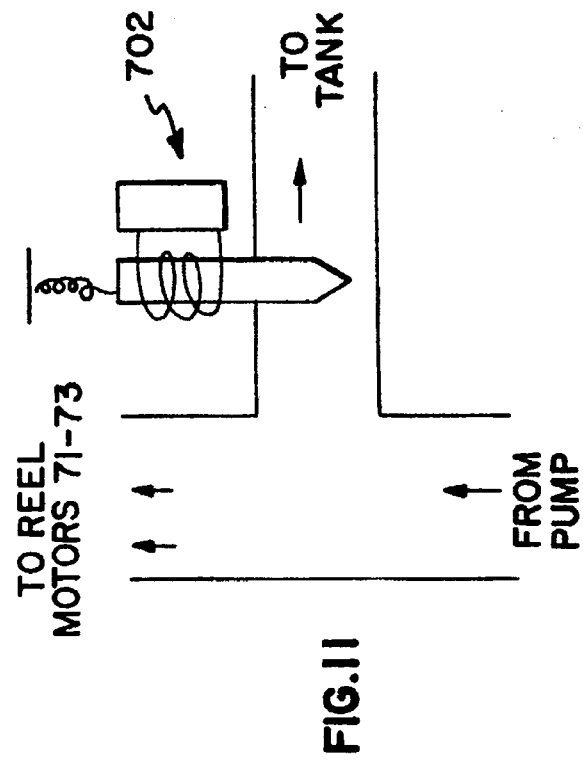

Toro Diagnostic Options:

1 -- Watch switches without running machine
    2 -- Watch the machine while running
    3 -> Filter inputs by functional states
    4 -> Open Data File for PC Capture
    5 -> Analyze data from Data Log Controller
    6 -- Display input and output locations
    7 -- ECU Program Status
    8 -> Edit Functional States
    9 -> Drive Controller States
    A -> Print Functional States Enter your choice:    5 [ENTER]

— 234

Toro Data Log Controller Analysis

1. ) Analyze a previously saved file
2. ) Read data from the Data Log Controller Enter your choice:    2 [ENTER]

— 235

Options:

1. ) Watch the machine as it ran
    2. ) Compare input to functional state requirements
    3. ) Search inputs for functional state
    4. ) Save file for analysis later Enter your choice:

Toro Controller Status: Reelmaster 5100-D Revision 1.0h

| | | | |
|---|---|---|---|
| Open | Not Used | On | Out of Range Lamp |
| Open | Not Used | Off | Solenoid S8, S9 (Backlap) |
| Closed | Key in Run position | Off | Solenoid S2 (Rear Reels) |
| Closed | Traction Neutral | On | Solenoid S3 (Wing Lift/lower) |
| Closed | Seat Switch | On | Solenoid S4 (Center Lift/lower) |
| Open | High Engine Temperature | Off | Solenoid S5 (Rear Lift/Lower) |
| Open | Not Used | On | Solenoid S6 (Lower Front & Rear) |
| Open | Raise Reels | On | ETR Hold, Alt/Run |
| Closed | Enable Reels | On | Solenoid VS1 (Front Speed Control) |
| Closed | Front Reels Down Switch | Off | Solenoid VS2 (Rear Speed Control) |
| Open | Front Backlapping | On | Solenoid S1 (front Reels) |
| Open | Rear Backlapping | Off | Solenoid S7 (Raise Reels) |
| Closed | Lower / Mow Reels | Off | Start |
| Open | 5/8 (Closed=) Blade Switch | Off | Preheat |
| Open | Front Reels Speed Switch | | |
| Open | Rear Reels Speed Switch | | |
| Open | Transmission Speed Sensor | | |
| Open | Not Used | | |

10 of 13.) Time prior to last data capture    5.9    seconds
ESC to exit, 'f' goes forward one record, 'space' back one record

FIG. 16a

Toro Controller Status: Reelmaster 5100-D Revision 1.0h

| | | | |
|---|---|---|---|
| Open | Not Used | On | Out of Range Lamp |
| Open | Not Used | Off | Solenoid S8, S9 (Backlap) |
| Closed | Key in Run position | On | Solenoid S2 (Rear Reels) |
| Closed | Traction Neutral | On | Solenoid S3 (Wing Lift/lower) |
| Closed | Seat Switch | On | Solenoid S4 (Center Lift/lower) |
| Open | High Engine Temperature | On | Solenoid S5 (Rear Lift/Lower) |
| Open | Not Used | On | Solenoid S6 (Lower Front & Rear) |
| Open | Raise Reels | On | ETR Hold, Alt/Run |
| Closed | Enable Reels | On | Solenoid VS1 (Front Speed Control) |
| Closed | Front Reels Down Switch | On | Solenoid VS2 (Rear Speed Control) |
| Open | Front Backlapping | On | Solenoid S1 (front Reels) |
| Open | Rear Backlapping | Off | Solenoid S7 (Raise Reels) |
| Closed | Lower / Mow Reels | Off | Start |
| Open | 5/8 (Closed=) Blade Switch | Off | Preheat |
| Open | Front Reels Speed Switch | | |
| Open | Rear Reels Speed Switch | | |
| Open | Transmission Speed Sensor | | |
| Open | Not Used | | |

11 of 13.) Time prior to last data capture    5.5  seconds
ESC to exit, 'f' goes forward one record, 'space' back one record

FIG. 16b

Toro Controller Status: Reelmaster 5100-D Revision 1.0h

| | | | |
|---|---|---|---|
| Open | Not Used | On | Out of Range Lamp |
| Open | Not Used | Off | Solenoid S8 , S9 (Backlap) |
| Closed | Key in Run position | Off F | Solenoid S2 (Rear Reels) |
| Closed | Traction Neutral | On | Solenoid S3 (Wing Lift/lower) |
| Closed | Seat Switch | On | Solenoid S4 (Center Lift/lower) |
| Open | High Engine Temperature | On | Solenoid S5 (Rear Lift/Lower) |
| Open | Not Used | On | Solenoid S6 (Lower Front & Rear) |
| Open | Raise Reels | On | ETR Hold, Alt/Run |
| Closed | Enable Reels | On | Solenoid VS1 (Front Speed Control) |
| Closed | Front Reels Down Switch | On | Solenoid VS2 (Rear Speed Control) |
| Open | Front Backlapping | On | Solenoid S1 (front Reels) |
| Open | Rear Backlapping | Off | Solenoid S7 (Raise Reels) |
| Closed | Lower / Mow Reels | Off | Start |
| Open | 5/8 (Closed=) Blade Switch | Off | Preheat |
| Open | Front Reels Speed Switch | | |
| Open | Rear Reels Speed Switch | | |
| Open | Transmission Speed Sensor | | |
| Open | Not Used | | |

12 of 13.) Time prior to last data capture    5.4   seconds
ESC to exit, 'f' goes forward one record, 'space' back one record

FIG. 16c

PC PROGRAM

TURF MAINTENANCE VEHICLE DIAGNOSTICS AND PARAMETER CONDITION LOGGER

This application is a continuation-in-part of U.S. patent application Ser. No. 07/816,816, filed Jan. 3, 1992, and having the title ELECTRONIC CONTROL FOR TURF MAINTENANCE VEHICLE, now abandoned in favor of File Wrapper Continuation Ser. No. 08/249,098, filed May 23, 1994.

FIELD OF THE INVENTION

The present invention relates generally to turf maintenance, and more particularly to an electronic controller for a turf maintenance vehicle which includes diagnostic tools and a memory array for storing monitored parameters and calculated outputs in a predetermined manner.

BACKGROUND ART

Commercial riding lawn mowers of the type used on golf courses, athletic fields and the like, are relatively large machines which often utilize cutting reels as opposed to rotary blades. Typically on such mowers two or three cutting reels are provided across the front of the mower. Additionally, one or more cutting reels are positioned in trailing relationship behind the gaps between the front cutting reels. The cutting reels make direct contact with the grass when cutting, following the contour and undulations of the terrain as the mower moves over the ground. The Toro Company, which is the assignee hereof, manufactures and sells several examples of such mowers.

Although the present invention relates to turf maintenance vehicles usable in a large variety of situations (including but not limited to cutting grass in parks, athletic fields, golf courses, etc.), the maintenance of golf courses will be utilized herein for the purposes of illustration. Continuing with the golf course example, it will be immediately appreciated that cutting grass on a golf course is a recurring and time consuming task. Further, the particular tee or fairway is typically taken out of service while the cutting is occurring. Accordingly, it is desirable to drive the mower as fast as possible while maintaining the desired cutting height and quality of cut, since the ground speed of the mower while cutting is directly related to the time necessary to cut the particular tee or fairway. However, in such settings the potential ground speed depends upon the ability of the cutting reels to maintain the desired quality of cut. Those skilled in the art will appreciate that the potential ground speed is also affected by variations in the terrain, the experience of the operator, and the turf conditions. Still other considerations include the type of grass, the moisture on the grass and/or the moisture content of the grass, and the desired cutting height of the grass.

In order to optimize the quality of cut while maximizing the ground speed, an electronic controller unit is utilized by the Toro Company of Minneapolis, Minn. on its model designation Reelmaster 5100-D. The operation of such controller is disclosed in detail in U.S. patent application Ser. No. 07/816,816, filed Jan. 3, 1992, and titled ELECTRONIC CONTROL FOR TURF MAINTENANCE VEHICLE which is hereby incorporated herein by reference.

Those skilled in the art will recognize that such controllers on turf maintenance vehicles in the past have not been utilized due to various factors, including the environment in which the machines must operate, the durability of electronic controllers, the level of applications for electronic controllers, and the expertise in the field (which was directed to mechanical solutions), among others. Additionally, diagnostic devices to determine electrical problems and malfunctions in the turf maintenance vehicle art have not heretofore been fully developed for many of the same reasons.

Since golf courses must be maintained at a high level in order to attract golfers, turf maintenance vehicles must be reliable and cannot incur more than a minimal amount of downtime. Thus, as the sophistication of the electronic controller devices increases, so too must the sophistication of the diagnostic devices which can troubleshoot electrical problems. However, the diagnostic devices must be convenient for use in the field since turf maintenance vehicles are typically repaired on site in order to further reduce downtime. Similarly, the grounds crew is oftentimes the repair personnel and so the diagnostic device must be extremely user friendly to specifically point out the source of the problem.

In the automotive art, various electronic controllers have been utilized for engine operation. The present inventors believe that such automotive controllers include error codes which are generated by the controller in the event that one or more parameters are not within expected ranges. However, the generation of an error code tends to presuppose that all errors have been predetermined. If a large number of possible errors exist, then the overhead required to determine and store all possible errors becomes very large. It also presupposes that all possible errors are known. The alternative is to generate a general error code for one or more possible errors. In the latter case, however, merely knowing that an error occurred requires that the engine is restarted and connected to a real time diagnostic device to determine the cause of the generated code. In other words, the general error code itself does not contain enough information to determine the specific cause of the problem which originally caused the code to be generated.

These problems make the automotive solution inapplicable to a turf maintenance vehicle setting. First, as alluded to above, removal of the turf maintenance vehicle to a shop for such analysis is impractical and is at odds with the original reasons to include the controller (i.e., optimize quality and speed of cutting, and minimizing downtime). Second, generation of an error code for each possible monitored parameter/fault combination is virtually impossible (i.e., due to the number of monitored parameters and calculated outputs of the 5100-D, the number of combinations is theoretically $2^{18}=262,144$). Third, given the parameters which are monitored, often it is impossible to determine whether the condition of the parameter constitutes an error. Thus, all errors are not necessarily determined in advance, and the presupposition that all of the errors have been predetermined makes a complete list of error codes inappropriate.

Accordingly, there arises a need for a turf maintenance vehicle controller which preferably includes a memory array means to store the status of the various monitored parameters, the ability to provide such data in real time to a diagnostic apparatus, and to store the data for later analysis by either the diagnostic apparatus or a remote microprocessor.

SUMMARY OF THE INVENTION

The present invention provides for a turf maintenance vehicle controller which includes data logger/memory array means to store the status of predetermined parameters (preferably inputs and computed outputs). The invention further includes the ability to provide such data in real time to a convenient hand-held diagnostic apparatus or a remote microprocessor, and/or to store the data for concurrent or later analysis by either the diagnostic apparatus or a remote microprocessor. A preferred diagnostic device constructed according to the principles of the present invention provides these functions so as to minimize the downtime of the vehicle, optimize the diagnostic functions and maintenance of the vehicle, and provide a user-friendly diagnostic tool.

In a preferred embodiment, a first electronic controller monitors various parameters and computes outputs to help establish logical operation of various functions of the turf maintenance vehicle. Sensors provide the input to the first controller (i.e., a microprocessor). In the preferred embodiment, an optimized "clip" is an additional function of the first controller. The first controller is located on board the turf maintenance vehicle.

The first controller transmits the status of the various monitored inputs and computed outputs to an RS-232 port. Preferably, the transmission occurs each time that the status of any one of the parameters changes. Additionally, an indication of the relative time is included in the transmission in order to maintain the real-time sequence of the monitored parameters. From the port, the data may be utilized immediately by a hand-held diagnostics display, by a remote computer, or by a memory array means. In the preferred embodiment, the memory array means is comprised of a second electronic controller having random access memory and non-volatile memory. When in use to capture data, the memory array is located on the turf maintenance vehicle so as to connect to the RS-232 port.

In operation, the memory array means initializes its memory and turns on a serial interrupt. Thereafter, each time an interrupt is generated (i.e., when the first controller transmits the status of the parameters) the characters representative of the status of the monitored parameters are moved into a portion of the memory array means (RAM memory), and a character counter is incremented. The memory array means further includes a switch which stops the process by turning off the transmit/receive interrupt. Until that time, however, the characters are stored in a predetermined sequence. Accordingly, a time coherent record of the status of each of the monitored inputs and outputs is maintained.

After the stop switch is enabled, the data in the RAM memory is copied to programmable erasable read-only memory (PEROM), and a red LED is turned on to indicate that the memory array means has stopped storing data.

One feature of the present invention is the utilization of a table of required conditions prior to engaging and/or allowing specific machine functions. Since the electronic controller includes a microprocessor, the advanced functionality of the processor may be further utilized by including an advanced logical grid of allowed conditions of turf maintenance operations.

Another feature of the present invention is the inclusion of advanced diagnostic capabilities. In the preferred embodiment the first controller determines whether any fault conditions exist and notifies the operator of the same. The condition of the various inputs and outputs to the processor is preferably provided to a serial port for real time analysis. This allows an operator to determine the status of the parameters when the fault occurred. The serial port also can provide the data to a memory array means to store the parameters, thereby keeping a data log of the status of the turf maintenance vehicle. The memory array may be sized according to the desired amount and/or timed length of information. Such stored information is generally very helpful to maintain and diagnose such vehicles.

A third feature of the preferred embodiment is the ability to interface with a remote personal computer to analyze the data either as a record from a stored file (e.g., from a floppy disk) or in real time through an RS-232 port. The personal computer can preferably scan through each of the records and highlight changes, if any, from the previous record.

Yet another feature of the preferred embodiment is a hand held diagnostic tool which is used to monitor the ongoing status (i.e., real time status) of the monitored parameters. This tool is comprised of a series of LEDs which indicate the logical status of the monitored parameters transmitted from the electronic controller. The information is updated each time that a new record is transmitted from the electronic controller. The tool is a rugged and relatively inexpensive way of providing a useful field diagnostic device. Additionally, the tool immediately provides the exact status of each monitored parameter so no interpretation of error codes needs to be performed, thereby decreasing the chance of misinterpreting a code. The use of this type of device enables for diagnosing problems when error codes have not been predefined.

Therefore, according to one aspect of the present invention, there is provided a diagnostics device for a turf maintenance vehicle, comprising: a microprocessor for monitoring the status of a plurality of predetermined parameters and generating a signal indicative of the status of said parameters, wherein the actual parameter status is contained within said generated signal; memory array means, cooperatively connected to said microprocessor, for receiving said generated signal and for storing said signal in a predetermined fashion, whereby subsequent analysis of the status of said parameters in a time coherent manner is facilitated; and diagnostic tool means, cooperatively connected to said memory array means, for visually displaying said generated signal, and wherein said diagnostic tool means displays the actual parameter status over time.

These and other advantages and features which characterize the present invention are pointed out with particularity in the claims annexed hereto and forming a further part hereof. However, for a better understanding of the invention, the advantages and objects obtained by its use, reference should be made to the drawing which forms a further part hereof, and to the accompanying descriptive matter, in which there is illustrated and described a preferred embodiment of the present invention.

BRIEF DESCRIPTION OF THE DRAWING

In the Drawing, wherein like reference numerals and letters indicate corresponding elements throughout the several views:

FIG. 10a is a diagrammatic illustration of the side cross section view of the resulting shape of the grass as cut by the reel blades in FIG. 9;

FIG. 10b is a diagrammatic illustration of a top view of the resulting shape of the grass as cut by the reel blades in FIG. 9;

FIG. 11 is a diagrammatic illustration of valve 702 of FIG. 7;

FIG. 15 illustrates the command menus of the remote personal computer program;

FIGS. 16A–16C illustrate screen displays of the remote personal computer program showing the status of the various monitored inputs and outputs;

DETAILED DESCRIPTION OF THE PREFERRED EMBODIMENT

The principles of this invention apply to the monitoring and storing of parameters in a turf maintenance vehicle. The apparatus and method include the gathering of parameter status, transmitting the gathered information to a memory array means, and storing and updating a RAM array with the transmitted information. The data is stored in accordance with a predetermined criteria in order to evaluate the data at a later time in a time coherent manner (i.e., the real time sequence and relationship is preserved to review the data at a later point as it occurred).

As noted above, although the example of mowing in a golf course environment will be utilized herein, those skilled in the art will appreciate that such application is only one of many turf maintenance environments in which the principles of the present application might be utilized. Accordingly, the golf/fairway examples presented herein should not be construed in a limiting manner. Also, those skilled in the art will appreciate that although the present device is illustrated in the Figures as residing on a particular turf mower, it should be understood that any number of turf mowers can utilize the present invention.

GENERAL OVERVIEW

A detailed description of the present invention will be deferred pending brief discussions of the term "clip", the PID control process, an example turf maintenance vehicle, and the first electronic controller.

Figure 9:
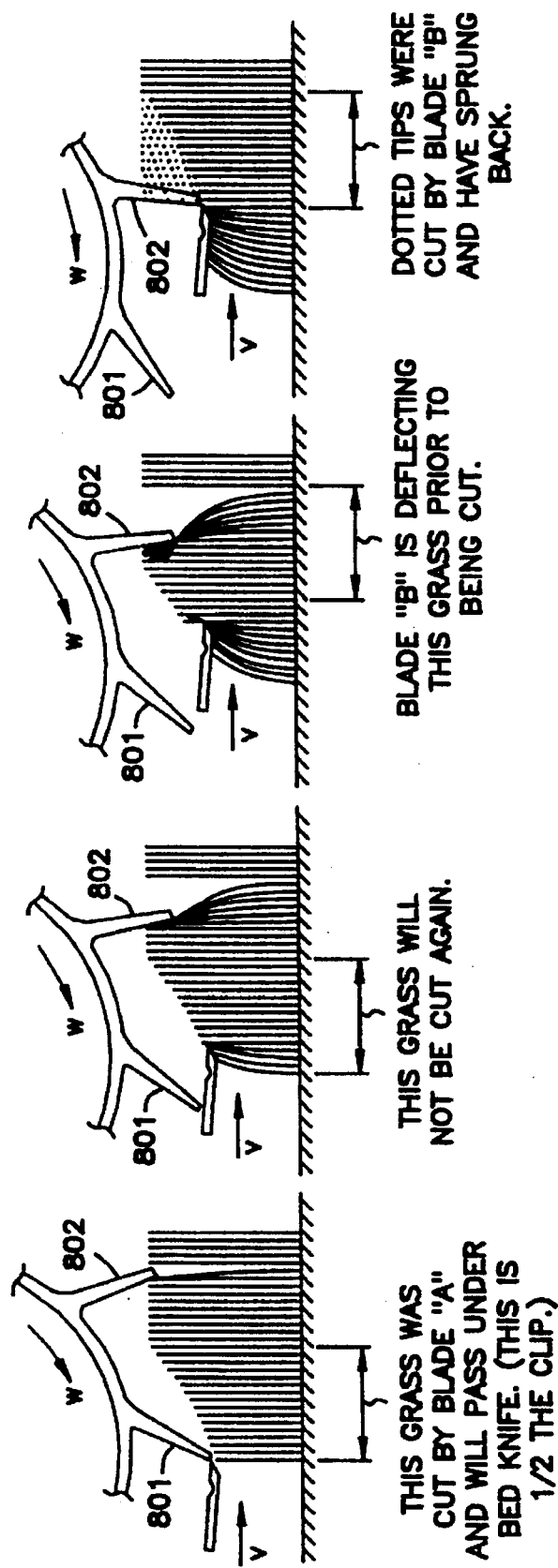
FIG. 9 is a graphic illustration of blades A and B moving past a bed knife and the cut which results.

First, as briefly noted above, and as those skilled in the art will appreciate, clip may be defined as the geometrical relationship of the linear distance between adjacent peaks of grass blades over a distance subsequent to a reel mower having passed over the grass in an operative manner (i.e., cutting manner). Briefly, clip is caused by the individual reel blades passing in a circumferential manner about an axis of rotation, while the axis of rotation moves along a line. FIGS. 9 and 10 illustrate how clip occurs.

As those skilled in the art will appreciate, there is not a common definition of an optimized exact clip other than by intuitive feel or by empirical study. Therefore, a first controller 100 is used to optimize the clip by driving the reels at a certain speed in view of the ground speed. A look-up table is used to determine the reel speed given a certain ground speed.

Figure 4:
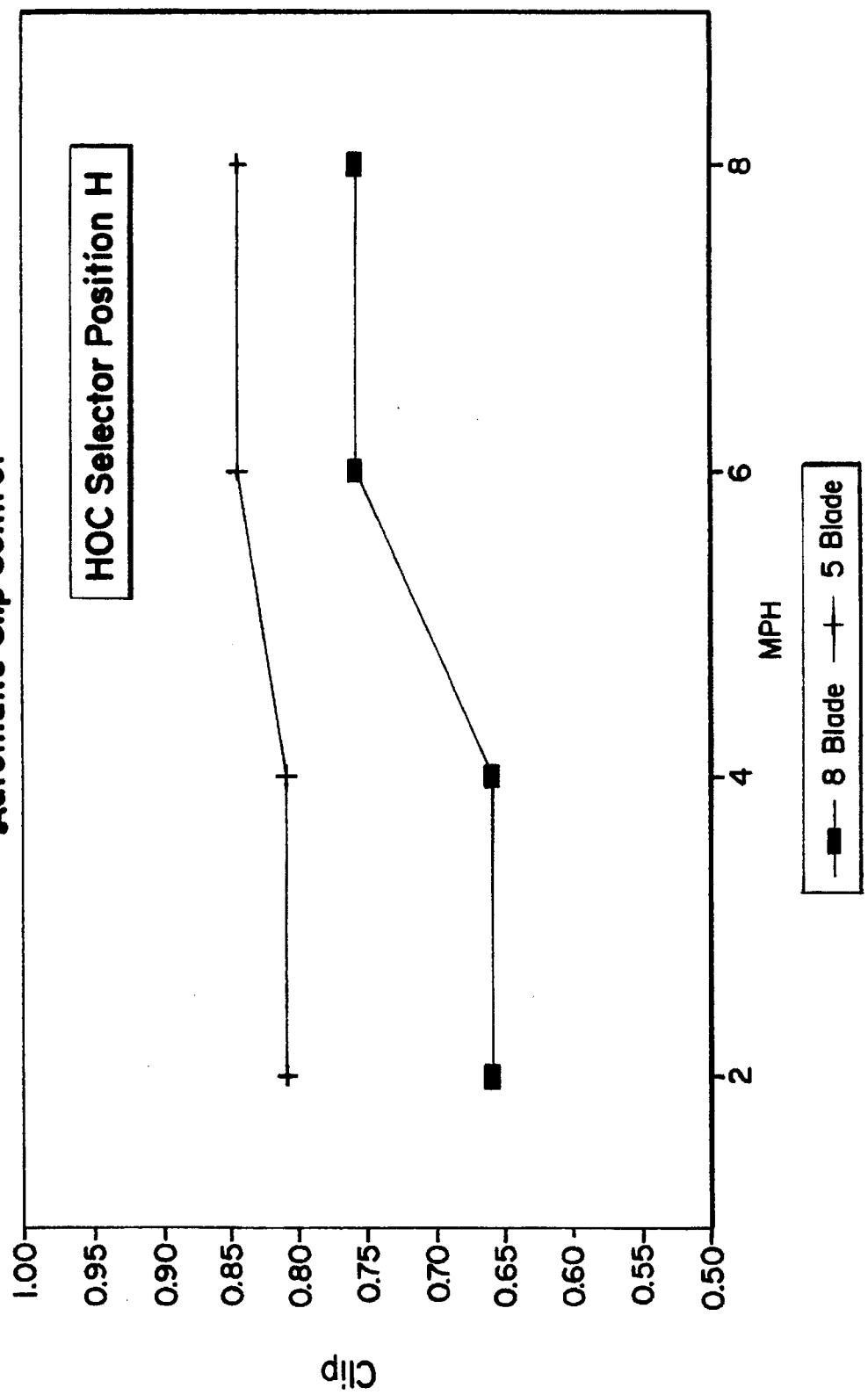
FIG. 4 is a graphical illustration of the data points comprising a look-up table stored in block 107 of FIG. 3 which act as input to the PID control.

The data points of the look-up table are graphically illustrated in FIG. 4. The reel speed itself is regulated to reside between maximum and minimum values which are predetermined (i.e., "clamped").

Second, to control the reel speed, the first controller utilizes a feedback loop. In the preferred embodiment, this feedback loop includes a PID control algorithm.

Figure 5:
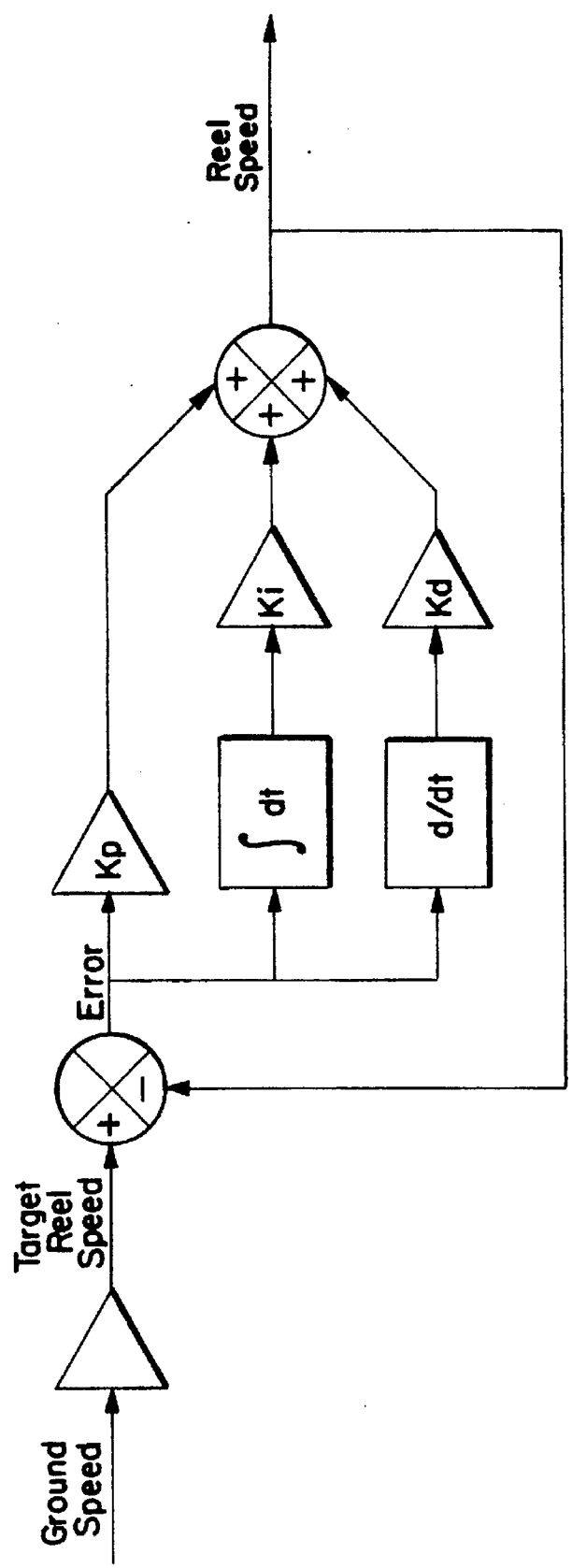
FIG. 5 is a logical control process diagram of the PID control utilized by the clip controller apparatus.

By using PID control, the reel speed is properly and quickly maintained at predetermined speeds depending on various parameters. FIG. 5 illustrates the functional PID control loop. Those skilled in the art will appreciate that other types of control algorithms or equations could be used.

Figure 1:
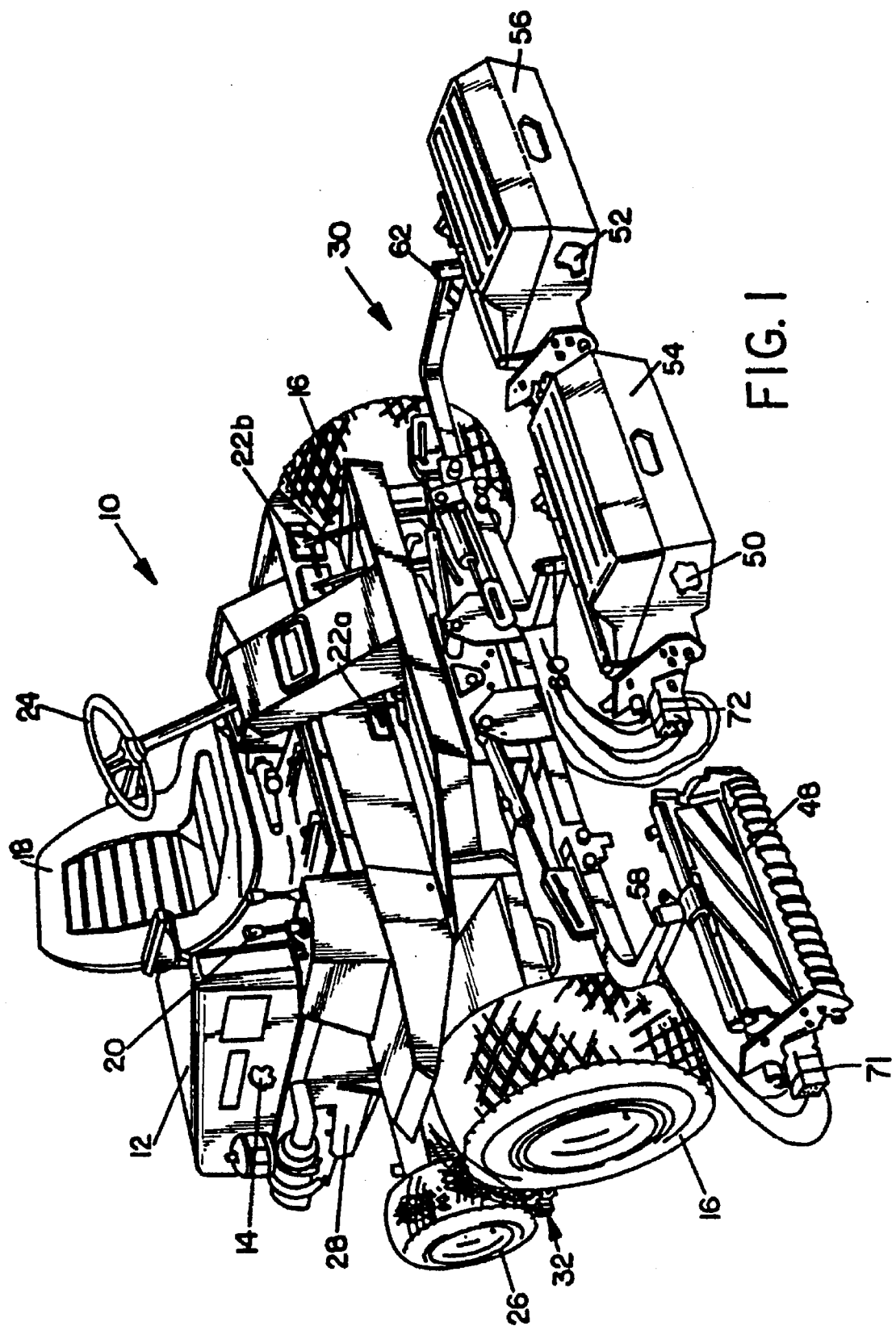
FIG. 1 is a perspective view of a commercial riding turf mower 10 on which an electronic controller and diagnostics apparatus constructed according to the principles of the present invention may be utilized.
Figure 2:
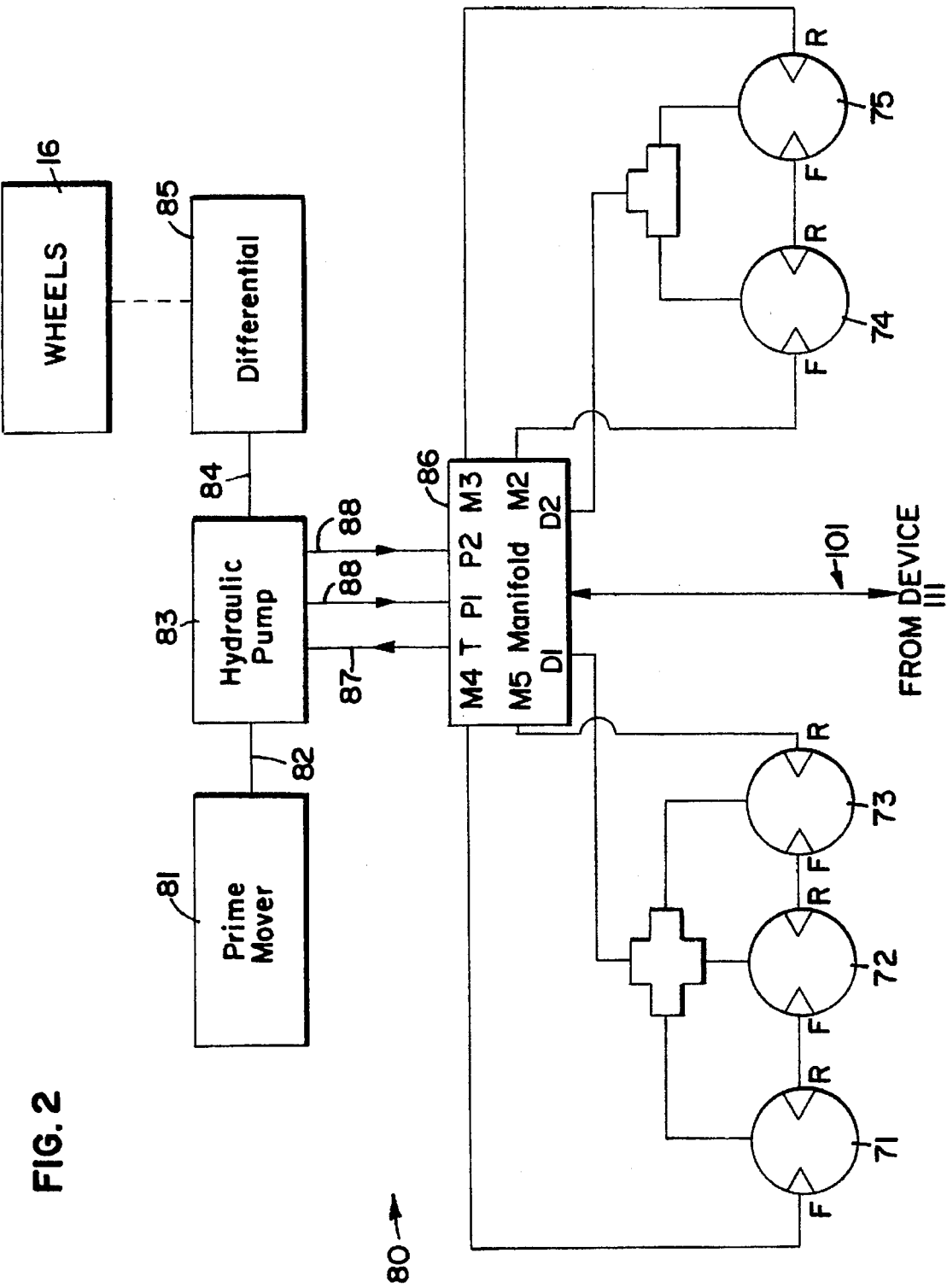
FIG. 2 is a block diagram illustrating the hydraulic fluid system of the mower 10 of FIG. 1.
Figure 7:
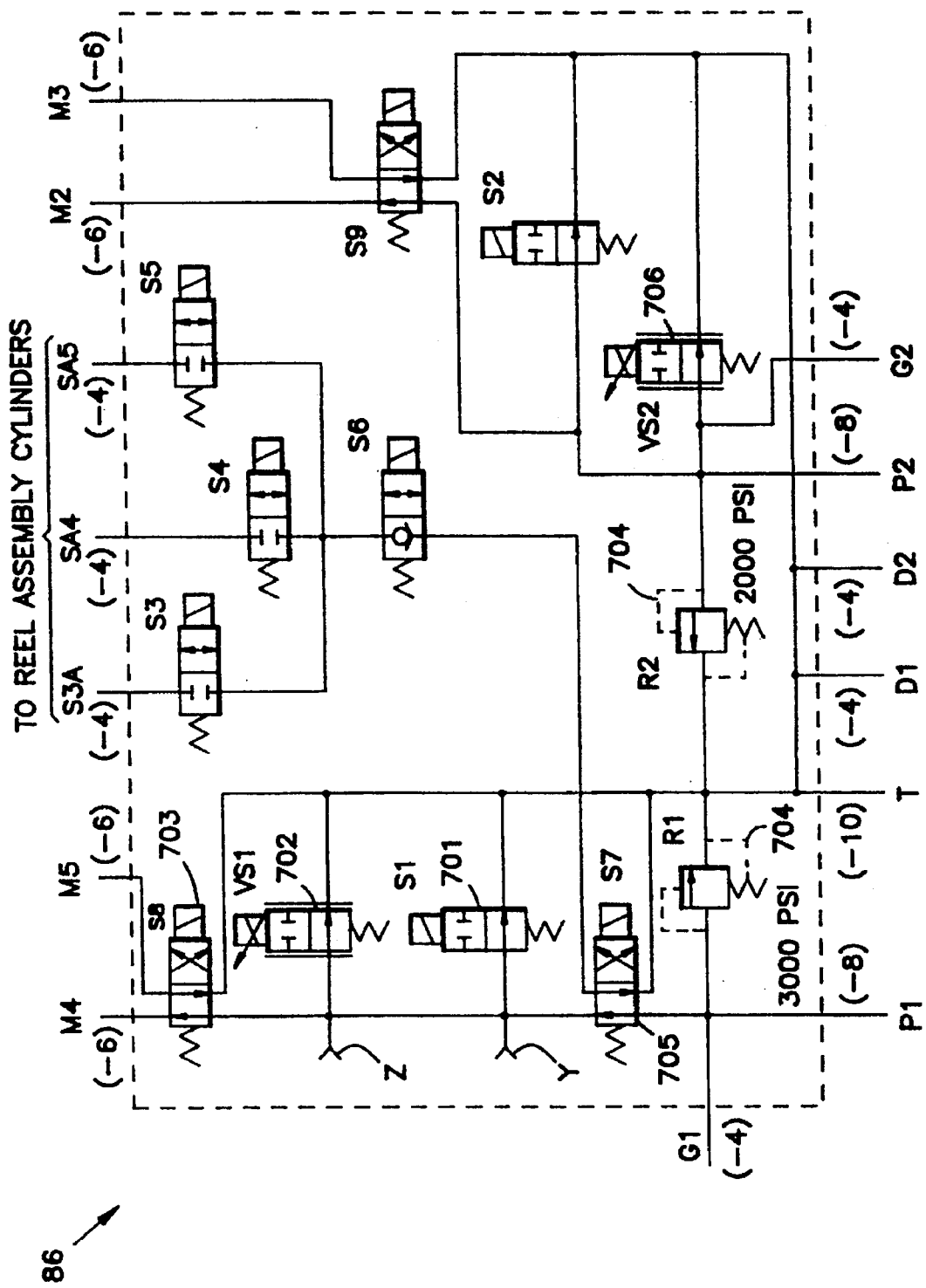
FIG. 7 is a schematic diagram of the hydraulic fluid manifold block 86 of FIG. 2.

Third, referring to FIGS. 1, 2, and 7, there is illustrated a preferred embodiment apparatus configured in accordance with the principles of the present invention. Referring particularly to FIG. 1, there is shown a typical commercial riding mower 10 with which the present invention may be used. As noted above, such mowers are typically utilized for cutting large areas such as golf courses, football fields, parks and the like. The mower 10 includes a rear housing 12 enclosing an engine compartment 14 which is hydraulically coupled via a transmission (best seen in FIG. 2) to a pair of front driving or traction wheels 16. The operator sits in a seat 18 positioned in front of the engine housing 12 and controls operation of the mower 10 by means of hand controls 20, foot controls 22, and a steering wheel 24 which is cooperatively connected to a pair of rear steering wheels 26, only one of which is shown. The rear steering wheels 26 are of relatively smaller diameter and tread than the front traction wheels 16, for purposes of better maneuverability.

Still referring to FIG. 1, the mower 10 includes a frame having a projecting forward platform on which the foot controls 22a, 22b and pedestal for steering wheel 24 are mounted. A front lift arm assembly 30 is mounted on the front end of frame 28 between the front wheels 16, while a rear lift arm assembly 32 is mounted on the frame between the front wheels and the rear wheels 26. As will be explained more fully below, the lift arm assemblies 30 and 32 include lightweight cutting reels mounted on pivotal lift arms that are normally biased by adjustable spring assemblies downwardly into contact with the turf. Hydraulic cylinders operate to raise and lower the lift arms between their extreme positions. The operation of the lift arm assemblies is discussed more fully in U.S. Pat. No. 5,042,236, which is hereby incorporated herein by reference.

Cutting reels are mounted on the outer end of each of the lift arms of the front lift arm assembly 30. More particularly, cutting reel 48 is secured to the outer end of the right outboard lift arm 36, cutting reel 50 is secured to the outer end of the middle lift arm 38, and cutting reel 52 is mounted on the outer end of the left outboard lift arm 40. Each of the cutting reels 48, 50 and 52 is of substantially conventional construction, including hydraulically driven transverse blades positioned between front and rear transverse rollers. Such cutting reels 48, 50 and 52 are usually enclosed by grass shields and baskets, only two of which shields/baskets 54 and 56 are shown in FIG. 1 for the purposes of clarity.

Rear lift arm assembly 32 is mounted on the lower frame 28 between the front wheels 16 and the rear wheels 26. The rear lift arm assembly 32 includes left and right lift arms 120, only one of which is shown. Both arms are supported and biased downwardly by hydraulic actuators and adjustable spring assemblies respectively similar to those in front lift arm assembly 30.

Moving now to FIG. 2, there is illustrated the preferred hydraulic system 80. The hydraulic system 80 is energized by prime mover 81 which is cooperatively connected via drive shaft 82 to hydraulic pump 83. Hydraulic pump 83 is in turn connected to differential 85 via shaft 84. As those skilled in the art will appreciate, the differential 85 drives the wheels 16 in response to commands from an operator via the foot control 22a. Hydraulic pump 83 is connected to manifold 86 via input and output lines 87, 88 respectively and includes a hydraulic fluid reservoir tank. In the preferred embodiment, pump 83 is manufactured by Webster Fluid Power Products, Inc. of Easley, S.C., under the model designation 49913-6.

The manifold 86 includes connections for various devices and apparatus driven by hydraulics on the mower 10 including lifting the reels on the front reel deck 30 and rear reel assembly 32. For clarity the connections at manifold 86 are not shown in FIG. 2, but are illustrated in FIG. 7.

The reels are driven hydraulically via hydraulic motors 71 through 75. In the preferred embodiment, the hydraulic motors utilized are manufactured by Webster Fluid Power Products, Inc. of Easley, S.C., under the model designation 152-10000353 and are preferably of the constant displacement type. The motors 71–75 are cooperatively connected to the reels in a well known manner such that when hydraulic fluid passes through the reel motors 71–75, the reels rotate.

Microprocessor 102 (discussed in more detail below) is cooperatively connected to the manifold 101 to operate various valves within manifold 86. The valves (best seen in FIG. 11) control the hydraulic fluid flow to hydraulic motors 71–75.

Turning next to FIG. 7, it will be appreciated that the hydraulic fluid flow is assumed to be constant for a given motor speed. The flow will be described with respect to the front mower assembly, and it will be understood by those skilled in the art that the rear mower assembly 32 operates in a similar manner.

Hydraulic fluid enters the manifold 86 via line P1 and passes by pressure relief valve 704 which is normally closed. The fluid then passes through valve 705 which operates to provide fluid to the up and down operation of the front reel assembly. The remaining fluid continues to intersection "Y" wherein the fluid continues toward intersection "Z" if valve 701 is closed, but returns to the tank line "T" if the valve 701 is open. In the preferred embodiment, valve 701 is normally open which provides for a path of lesser resistance for the hydraulic fluid. When microprocessor 102 closes valve 701, then the hydraulic fluid continues toward intersection "Z."

Figure 12:
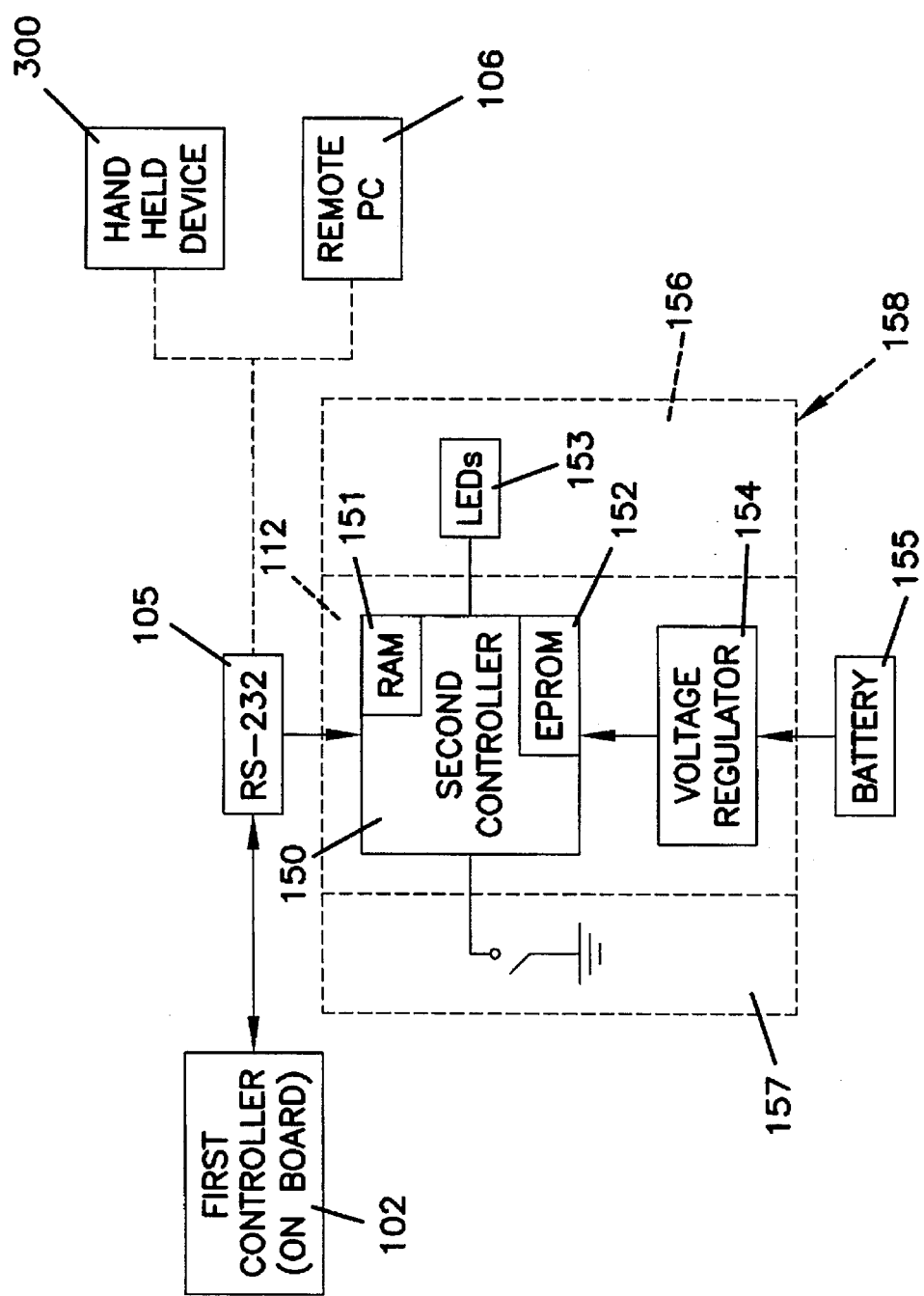
FIG. 12 is a functional block diagram illustrating the electronic components of the data log buffer block 112 of FIG. 3.

At intersection "Z" the hydraulic fluid again encounters a normally open flow path through valve 702. Accordingly, the fluid will normally flow through valve 702 toward the tank line "T" since there is less resistance than flowing through a reel motor 71, 72, or 73. As valve 702 is closed a larger amount of hydraulic fluid is forced to continue toward line M4 to the reel motors 71–73. The valve closes as a solenoid is energized by a pulse width modulated signal from the microprocessor 102. Therefore, as the duty cycle of the signal increases, the valve closes further. A spring normally biases the valve open. FIG. 12 diagrammatically illustrates valve 702. It will be appreciated that the valves 700–706 are generally of the variable orifice type.

Finally, the hydraulic fluid passes through diverter valve 703 which provides for diverting the fluid to operate the reels backward to enable backlapping. The dashed line in FIG. 7 designates block 86 of FIG. 2.

Figure 3:
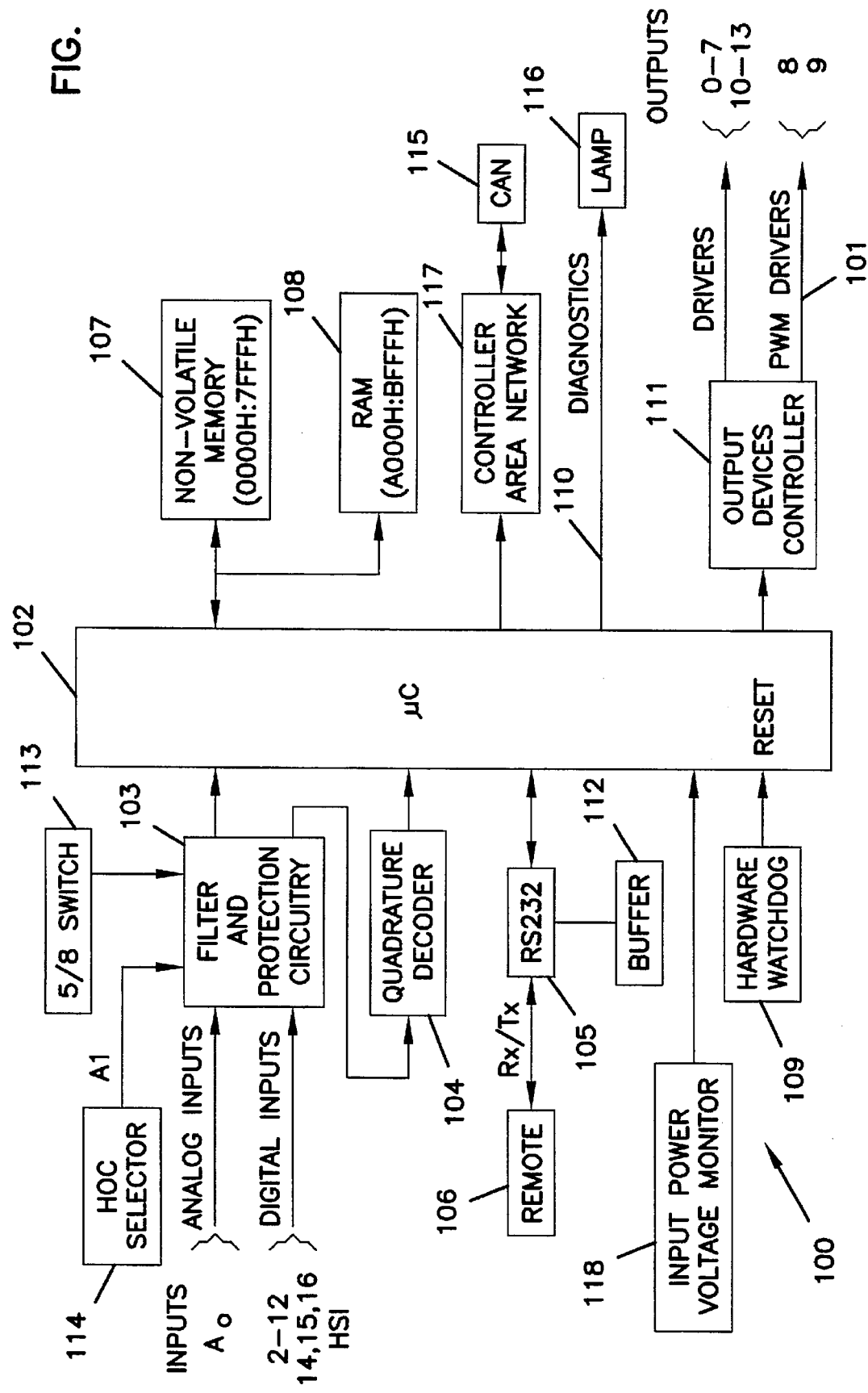
FIG. 3 is a functional block diagram illustrating the electronic components comprising a preferred embodiment controller apparatus.

Fourth, turning to FIG. 3, a preferred first electronic controller functional block diagram is presented. The electronic components are illustrated generally at 100. The heart of the controller 100 is microprocessor 102. Providing inputs to the microprocessor are filter and protection circuitry block 103 which includes analog and digital inputs. The inputs and outputs of microprocessor 102 are set forth below in Table 1 as follows:

TABLE 1

| Inputs: | Outputs: |
| --- | --- |
| A0 Start | 13 Preheat |
| A1 HOC Pot | 12 Start |
| 2 Run | 7 ETR Hold-Run/Alt. |
| 3 Neutral Switch | 10 S1 |
| 4 Seat Switch | 1 S8/S9 |
| 5 Temperature | 2 S2 |
| 6 Temp. Override | 3 S3 |
| 7 Raise | 4 S4 |
| 8 Enable | 5 S5 |
| 9 Down Switch | 6 S6 |
| 10 Front Backlapping | 11 S7 |
| 11 Rear Backlapping | 8 VS1 |
| 12 Lower | 9 VS2 |
| 13 ⅝Blade Reel switch | 0 Out of Range light |
| 14 Front Reels HSI | |
| 15 Back Reels HSI | |
| 16 Transmission Speed Sensor | |

Those skilled in the art will appreciate that these inputs and outputs are illustrative only and that other I/O functionality may be provided such that the microprocessor and first controller 100 in general operate in their intended manner. For example, the type of reel mower 10 may vary so as to provide different inputs to the filter and protection circuitry 103.

Certain inputs to the filter and protection circuitry block 103 are provided to the quadrature decoder ("QD") 104. The QD 104 receives the input from block 103 which was originally generated by encoder devices, such as optical encoders, to determine speed and direction of rotation (i.e., clockwise or counter-clockwise), although in the present preferred embodiment, only the speed information is utilized. Accordingly, reel-speed and ground-speed is determined at QD block 104. The process of determining the number of revolutions of transmission gear teeth and pickups on rotating objects such as the reels via optical encoders, Hall Effect switches, etc. is well known in the art and so will not be described further herein. Preferably magnetic pickups are used to determine the ground speed and reel speed although any number of other type devices may be used as will be appreciated.

RS-232 interface/diagnostic block 105 provides a two-way communication port to microprocessor 102 for diagnostics and testing. Additionally, a remote computer 106 may be utilized to provide field-loaded software instructions to reside in non-volatile memory block 107 or to perform diagnostics functions. Block 105 provides for the inclusion of advanced diagnostic capabilities. In the preferred embodiment the processor 102 determines whether any fault conditions exist and notifies the operator of the same via diagnostics line 110 which is connected to a warning lamp (not shown). Further, the condition of the various inputs and outputs to the processor is preferably provided to block 105 which allows for discerning the status of the same upon the occurrence of the fault by use of a remote hand held logic decoder (best seen in FIGS. 14 and 15) which is programmed to decode the fault status data provided to the block 105. The block 105 may also optionally provide the data to memory array means 112 to store a plurality of conditions to keep a data log of the status of the turf maintenance vehicle 10. The memory array 112 may be sized according to the desired amount and/or timed length of information. Such stored information is generally very helpful to maintain such vehicles. The diagnostic capabilities are described in more detail below.

Also connected to the processor 102 is block 118 which provides a power and voltage monitor function to the system 100. In the preferred embodiment, a resistive voltage divider feeds an analog-to-digital converter input to establish a digital representation of the battery voltage. Accordingly, block 108 may be used to calibrate input on other analog inputs to eliminate variations due to changes in input voltage.

Hardware watchdog block 109 provides a reset function by signaling the microprocessor's 102 reset line, if the watchdog block 109 is not toggled within a predetermined period of time. In the preferred embodiment, the watchdog block 109 is manufactured by Dallas Semiconductor of Dallas, Tex., having a model number designation DS1232.

Also providing inputs are HOC selector block 114 and the number of blades per reel block 113. Each of the foregoing blocks provides inputs to processor 102 which in the preferred embodiment is manufactured by Intel having a model designation 80C196KB. The microprocessor 102 is preferably a 16 bit microcontroller. Included with microprocessor 102 is nonvolatile memory block 107 and random access memory block 108.

Additionally, a CAN or "controller area network" block 117 may be provided to enable high speed communication via a defined protocol to other optional CAN controllers 115 which may be located on mower 10.

Diagnostics output line 110 is provided to a lamp 116 preferably located in a position easily visible to an operator in order to notify the operator of a fault condition.

Finally, block 111 includes an output devices controller block which in the preferred embodiment is manufactured by Siemens Components of Santa Clara, Calif., having a model designation BTS432L. The device block 111 comprises high speed drivers with built-in thermal protection, over-current protection, and open-circuit detection. Any of the foregoing conditions are reported as faults to the microcontroller 102. The device block 111 includes a plurality of high side drivers and several high speed pulse width modulated drivers.

While not specifically detailed in FIGS. 3 and 12, it will be understood that the various logic gates, flip-flops, microprocessors, etc. must be properly connected to appropriate bias and reference supplies so as to operate in their intended manner. Similarly, it will be understood that appropriate memory, clock oscillator, buffer and other attendant peripheral devices are to be properly connected for the devices to operate in their intended manner.

DESCRIPTION OF MEMORY ARRAY MEANS, THE DIAGNOSTIC TOOLS, AND THE REMOTE COMPUTER

Figure 8:
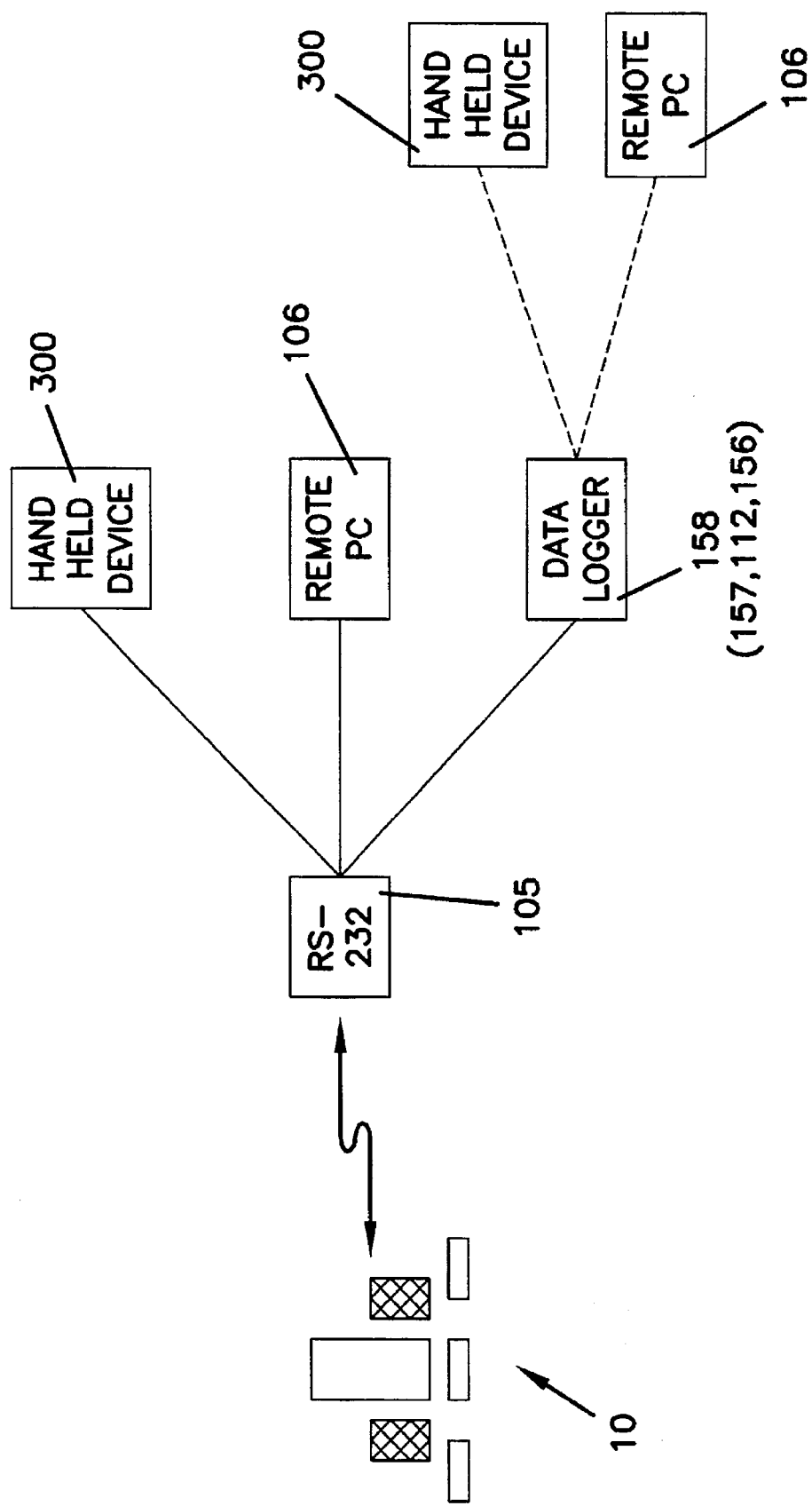
FIG. 8 is a graphic illustration of the diagnostic tools and the cooperative manner in which the tools are used in the preferred embodiment of the present invention.

Turning now to FIG. 8, there is illustrated a preferred embodiment of the present invention. RS-232 block 105 resides on turf maintenance vehicle 10 and provides a communication link to microprocessor 102 of the first controller (best seen in FIG. 3). Preferably each time that a monitored input or computed output change, the status of the parameters is generated and transmitted to block 105. However, those skilled in the art will appreciate that the status might be transmitted at predetermined intervals or in some other known fashion. By transmitting the data only after microprocessor 102 completes polling the inputs, calculates the outputs, and determining if a change occurred, a greater amount of data can be stored in the data logger block 158 (comprised of blocks 157, 112, 156). Additionally, this method maximizes the probability that the parameters will be stored with as few changes as possible in each discrete record. Thus, this method helps simplify analysis of the data being transmitted.

RS-232 block may optionally be connected to hand-held device 300, remote computer 106, and/or the data logger device 158 which is comprised of blocks 157, 112, 156. Additionally, the hand-held device 300 and the remote computer 106 may be connected to the data logger block 158 in order to analyze the data at a later time. When the hand-held device 300 and the remote computer 106 are connected directly to block 105, real-time diagnostics is made possible. Those skilled in the art will appreciate that connection of the data logger block 158 is especially useful in evaluating an intermittent error. Hand held device block 300 and remote PC block 106 are shown as being connected by dashed lines to data logger block 158 to better illustrate that they may be optionally attached to block 158 (similarly FIG. 12 illustrates the connection by dashed line).

Those skilled in the art will appreciate that when connected to block 105, the hand-held device 300, the remote PC 106 and the data log block 158 are "on board" the turf maintenance vehicle 10. However, each of the devices do not need to remain a part of vehicle 10 during routine operation. Also, the data log block 158 can be removed from vehicle 10 and the captured data analyzed remotely from the vehicle.

Figure 13:
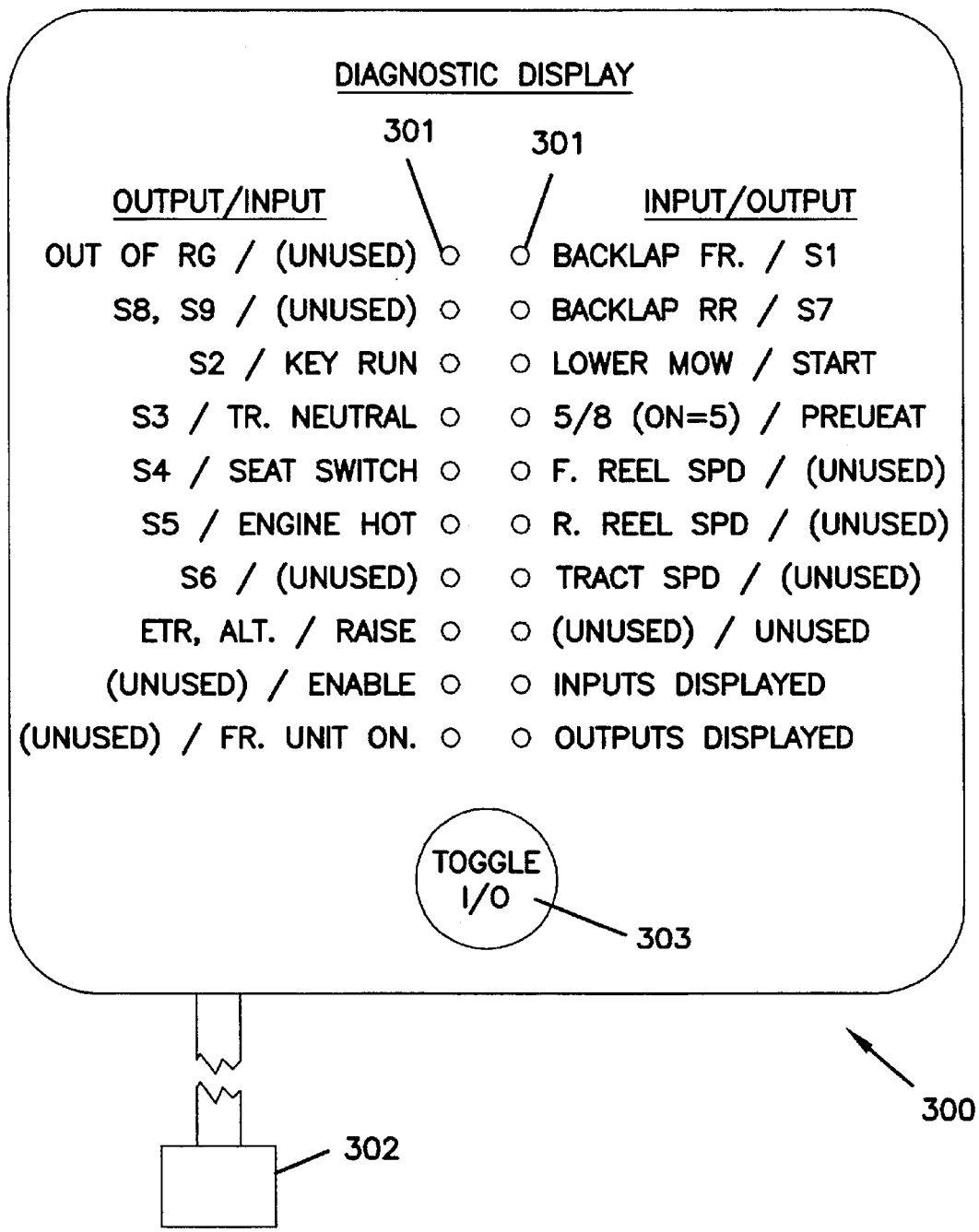
FIG. 13 is an illustration of the hand held diagnostic device.

An example of the manner in which the fault/status of the turf maintenance vehicle 10 may be provided to block 105 is set forth in Table 2 below as an eight (8) byte format with each bit representing an input or output. Table 1 above and FIG. 13 illustrate the various inputs and computed outputs that make up bytes 2–8 of Table 2. The individual bits are toggled to indicate the presence of the status of the I/O line and/or the presence of a fault. By toggling the bits, the hand held remote device 300 can comprise appropriate logic and buffer devices to light LEDs to signify the status and fault conditions. Additionally, a personal computer 106 may be appropriately connected with proper software to the RS-232 port 105 to analyze the diagnostic information.

TABLE 2

| BYTE | STATUS OF |
|------|-----------|
| 1 | Timing Character |
| 2 | Input switches 0-7 |
| 3 | Input switches 8-15 |
| 4 | Input switches 16, 17 |
| 5 | Output switches 0-7 |
| 6 | Output switches 8-13 |
| 7 | Fault status for outputs 0-7 |
| 8 | Fault status for outputs 8-13 |

In order to describe the data log block 158, reference should be had to FIG. 12 where there is illustrated a memory array means 112 which is comprised of a second controller 150 (which in a preferred embodiment is manufactured by Intel having Model Designation No. 80C196KB) and memory blocks 151 and 152. The microprocessor is preferably a 16 bit microcontroller. Included with the microprocessor is a nonvolatile memory block 152 and random access memory block 151. However, those skilled in the art will recognize that other devices which recognize incoming coded characters and place them sequentially into a buffer might similarly be used. Memory array means 112, indicator means 156, and termination means 157 are each shown by dashed line to illustrate the functional devices which in the preferred embodiment comprise such means.

The data log block 150 receives power from battery 155 via voltage regulator device 154. Connected to data log block 150 are red and green LEDs 153 which comprise indicator means 156 for visually alerting an operator to the status of the data log buffer. Single pole switch 157 comprises termination means for stopping the storage of the status coded characters into data log buffer block 150.

Figures 18A, 18B:
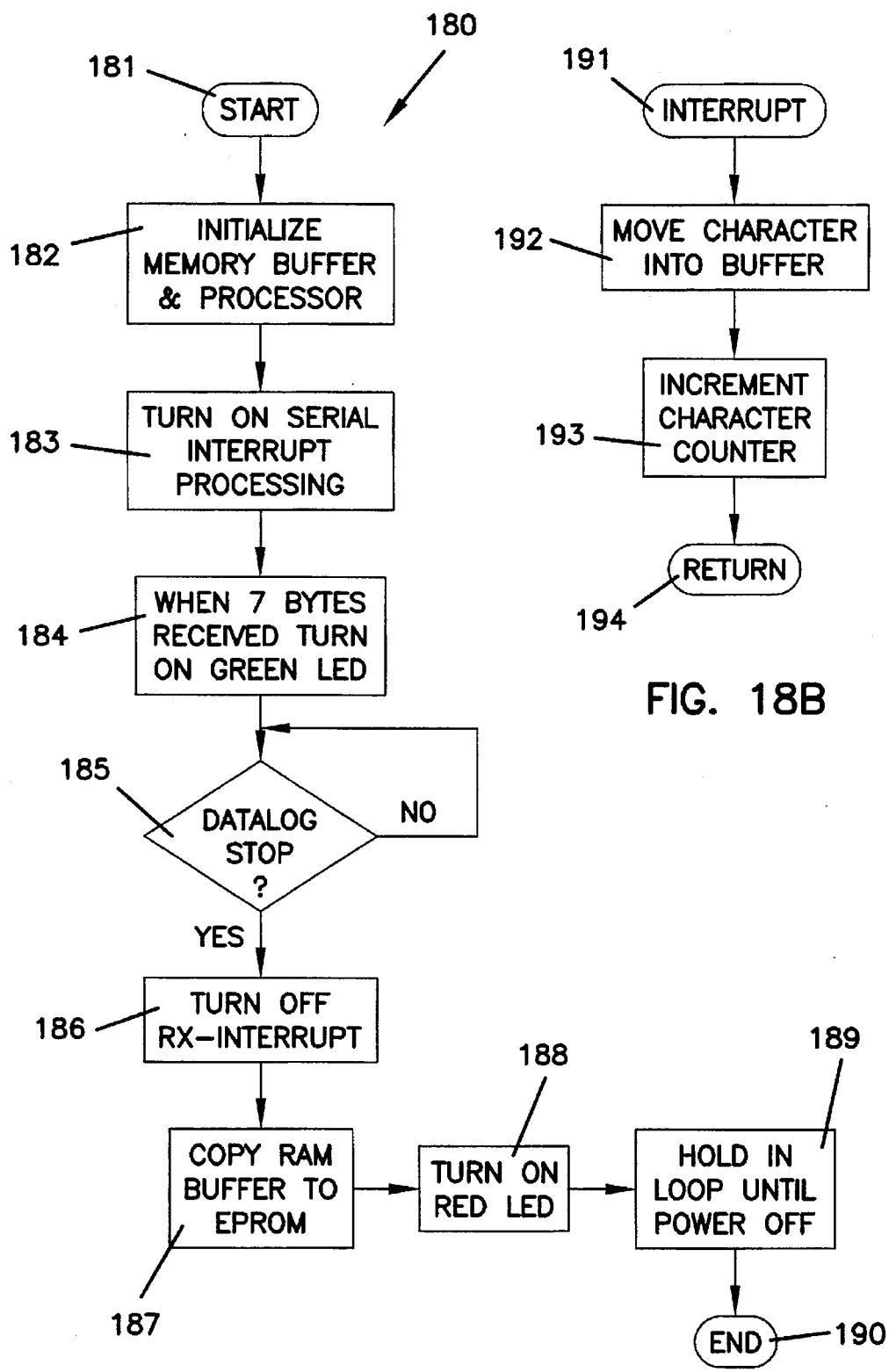
FIGS. 18a and 18b illustrate a logic block diagram illustrating computer program operation by the second controller of buffer block 11.

In operation, data log buffer block 150 operates in accordance with FIG. 18, where a logic flow diagram is illustrated at 180. The operation starts at 181 and moves to block 182 where memory blocks 151 and 152 and the processor operations are initialized. Proceeding to block 183, serial interrupt processing is enabled, so that interrupt signals generated by information received from RS-232 block 105 can occur. At block 184, when the first 7 bytes representing the parameter status are received, a green LED 153 is turned on to indicate proper operation of the data log buffer block 150.

Upon receipt of the 7th byte, the interrupt program starting at block 191 is activated and the characters are moved into RAM buffer 151 at block 192. Proceeding to block 193, the character counter is incremented and operation of the program is returned at 194.

The main program loop continues at block 185 by determining whether the switch 157 has been activated. If not, the program returns to block 184 to wait for the next interrupt driven process. However, if the data log stop switch 157 has been activated at block 185, the serial interrupt is turned off at block 186 and the sequence of stored status bytes is copied to the PEROM block 152 at block 187. Proceeding to block 188, a red LED is turned on. The green LED is left on to indicate captured data. The data log buffer block 150 is then held in a continuous loop until the power is shut down at block 189. The program ends at block 190. Since the data is moved into an PEROM, the data is safe until it is recalled by the remote PC 106 or the hand-held device 300 best seen in FIGS. 3, 8, and 12.

Figure 17:
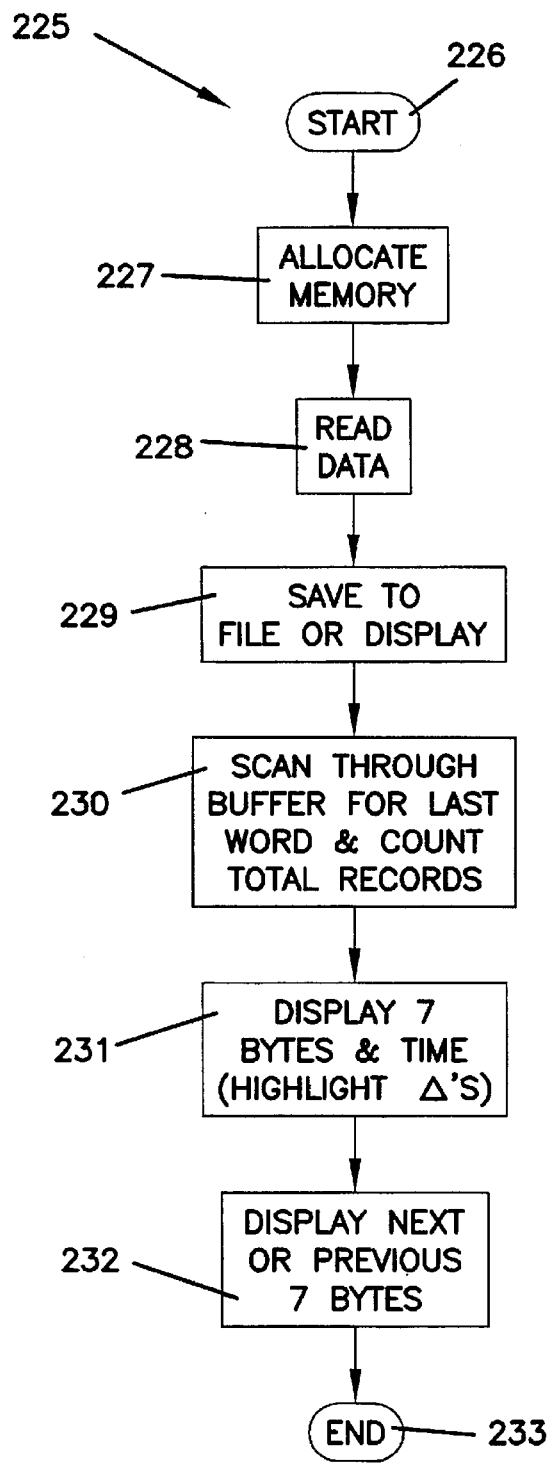
FIG. 17 is a logic block diagram illustrating computer program operation by the remote personal computer.

The remote PC 106 is useful in analyzing the transmitted signal of the parameter status (either in real time or from the stored data in the memory array means 112). The operation of the remote PC 106 will next be described. An example of the logical program flow useful in reading the data from the data log block 158 is illustrated generally at 225 in FIG. 17. Although the PC 106 will be characterized as "proceeding" from logical block to logical block, while describing the operation of the program logic, those skilled in the art will appreciate that programming steps are being acted on by a microprocessor.

First, the program starts at block 226 and proceeds to block 227 where memory is allocated. The personal computer then reads the data 228 from the data log block 150 via RS-232 ports 105. At block 229, the PC then optionally saves the file or initializes for display on a video display monitor. Continuing to block 230, the PC scans through the data which was captured for the last word and counts the total number of records. At block 231, the program displays the status of the monitored parameters by displaying the status as indicated by bytes 2-8 set forth in Table 2 above. Additionally, the time of the record and the changes in the parameter status from the previous record are displayed. Upon operation of appropriate key functions, the PC displays the next or previous parameter status at block 232 and the program ends at block 233.

FIG. 15 illustrates the screen menus of the PC to view the diagnostic conditions. At 234, the personal computer has allocated the memory and is waiting for input instructions (e.g., block 227 of FIG. 17). Choosing number 5 of block 234, the program asks whether data should be read from a previously saved file or from the data log controller (e.g., block, 228 of FIG. 17). If option 2 is selected, then options are possible (at block 236) including watching the status of the parameters of the turf vehicle as it ran, comparing the input to functional state requirements, searching inputs for various functional states, or saving the file for analysis at a later time (i.e., block 229 of FIG. 17).

FIGS. 16A-16C comprise a working example which illustrate the appearance of the PC screen displays when analyzing the parameters one record at a time. More specifically, the working example illustrates a "lower and mow" sequence. First in FIG. 16A, the lower/mow sequence is initiated and the front reels are lowered and instructed to start mowing. Second, in FIG. 16B, the back mowers are lowered and instructed to start mowing. This record occurs after FIG. 16A due to a predetermined delay in lowering the back reels relative to the front reels. The differences between FIG. 16A to FIG. 16B illustrate change in status of solenoid S2 (rear reels), solenoid S5 (rear lift/lower), and solenoid VS2 (rear speed control).

The record illustrated in FIG. 16C occurs approximately 0.1 second after the record illustrated in FIG. 16B and indicates that S2 faulted. This type of fault may occur due to an overcurrent condition, an undercurrent condition, or an overheated driver. The fault was diagnosed by the software of the microprocessor 102 and so S2 was shut off and the rear cutting units stopped. Solenoid S2 has an F in front of it to indicate a fault occurred.

In many instances, a remote PC is not practical for performing diagnostics in the field. Also, at times a less expensive alternative may be required to analyze the functionality of the first controller 102. Accordingly, a remote hand held device 300 (best seen in FIGS. 8, 13, and 14) can also be used to perform real time analysis of the status of the various inputs and computed outputs. In this device, LEDs 301 are illuminated when the operation of a parameter causes the corresponding bit of bytes 2-8 set forth in Table 2 above to go high. A toggle switch 303 is included to toggle the device 300 between output and input parameters. In this manner, the operation may be checked against the appropriate logical status conditions to determine the operation of the controller. Connector 302 is of a known type to connect to RS-232 block 105. Those skilled in the art will appreciate that by checking the condition of the parameter after the first controller 102 has analyzed the parameter and transmitted the status as part of the 8 byte record, the proper operation of the software of microprocessor 102 is also verified.

FIG. 13 illustrates an overlay which may be used to indicate the status of the monitored parameters by handheld device 300. Those skilled in the art will appreciate that any number of overlays might be used depending on the monitored parameters. Therefore, the overlay is merely an interpretive tool and other inputs and/or calculated outputs might be shown with different identifying words.

Figure 14:
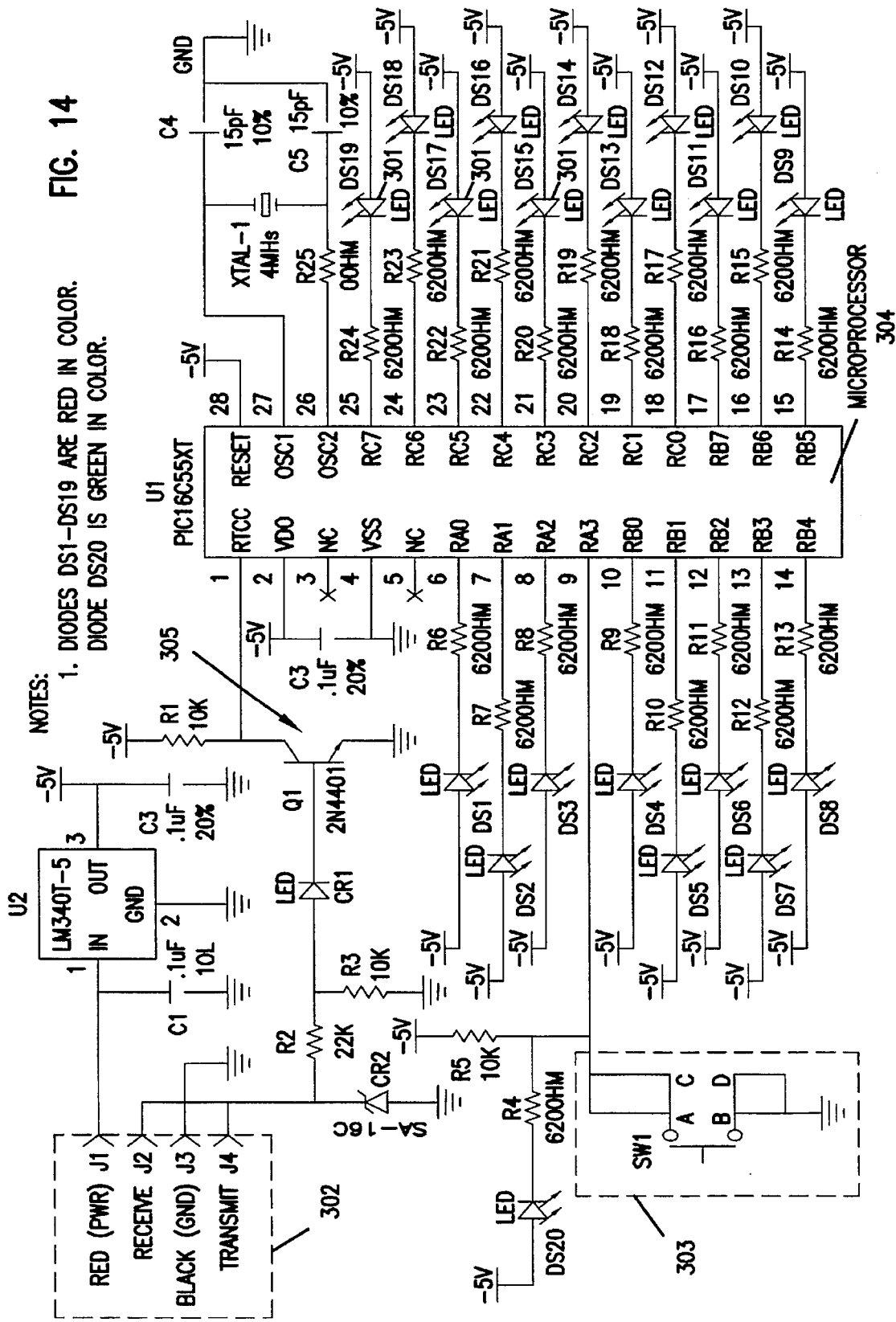
FIG. 14 is an electrical schematic of the hand held diagnostic device of FIG. 13.

FIG. 14 illustrates a preferred circuit used to decode the transmitted 8 byte signal in the hand held device 300. The device includes a programmable microprocessor chip 304. The connector 302 is cooperatively connected to the RS-232 block 105. The incoming transmitted signal is applied to the base of transistor device 305 which turns the transistor on and off. The collector of the device 305 is thereby switched between high and low voltage levels. This level is provided to pin 1 of microprocessor 304, the bits are decoded into the corresponding parameters set forth in Table 1 above, and the proper LEDs 301 are lit so as to correspond to the overlay shown in FIG. 13. Switch 303 toggles between inputs and outputs. However, additional LEDs could also be added.

OTHER FUNCTIONS AND OPERATION OF ELECTRONIC CONTROLLER

Figure 6:
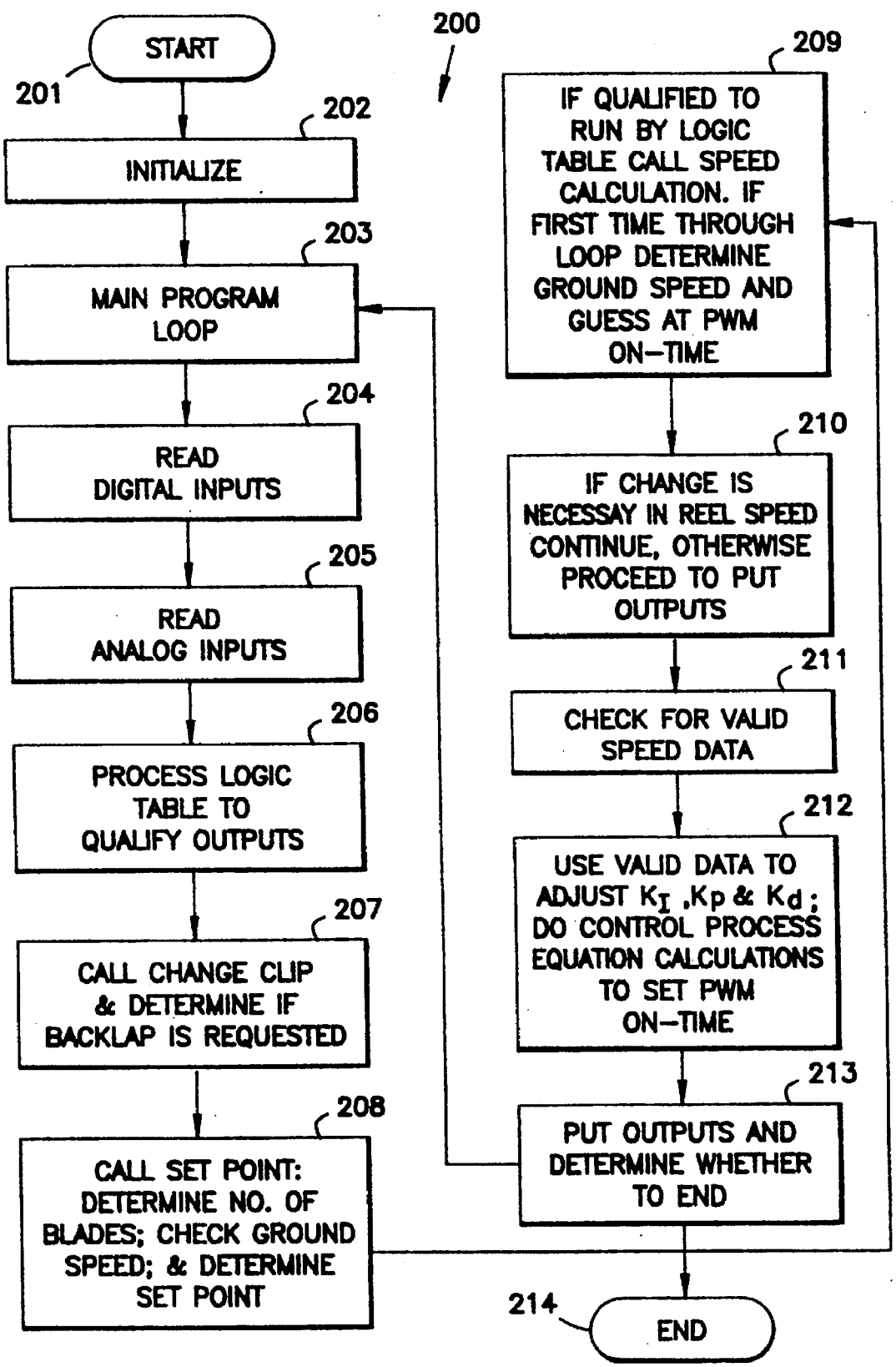
FIG. 6 illustrates a logic block diagram illustrating computer program operation by the microprocessor block 102 of FIG. 3.

As previously noted above in connection with the description of the hydraulic fluid system 80, the electronic controller 100 controls the speed of the reels by providing a pulse width modulated signal to valves 702, 706. Having now described in detail the hydraulic operation of the reels and the interconnection of the electronic controller 100, the logic flow of the controller in carrying out the optimization of the clip control is set forth in FIG. 6. In a preferred embodiment of a device constructed according to the principles of the present invention, the logic means comprises a microprocessor 102 which sequentially polls the inputs, including the asynchronous interrupts. A logic flow diagram of an embodiment of the program logic which might be resident in the microprocessor 102 or stored in nonvolatile memory block 107 or RAM 108 as illustrated in FIG. 6, wherein the logic diagram is shown generally at 200. The logic flow diagram 200 illustrates the steps taken to analyze the logical status of the various inputs and provide outputs to drive the reels at their proper speed relative to the ground speed (i.e., as illustrated in FIG. 6).

Although the microprocessor 102 will be characterized as "proceeding" from logical block to logical block, while describing the operation of the program logic, those skilled in the art will appreciate that programming steps are being acted on by microprocessor 102.

In operation, microprocessor 102 starts at block 201. Microprocessor 102 then proceeds to initialize at block 202. These functions include initializing the microprocessor, serial ports, input structures, output structures, high speed input processors, and high speed output processors (i.e., pulse width modulators).

At block 203, the microprocessor 102 begins the main control program loop. The first step of the main program loop is to proceed to block 204 where the digital inputs are read. Next, proceeding to block 205, various analog inputs are read to determine whether it is appropriate to allow the prime mover fuel solenoid to turn on (i.e., in a diesel system; however, those skilled in the art will appreciate that in a gasoline system an ignition coil may be ungrounded). The interlocking system of inputs A0, A1, and 1–16 are decoded at block 205 to provide various logical features of the turf maintenance vehicle 10 described herein.

Microprocessor 102 then proceeds to block 206 where a logic table is processed based upon the decoded inputs. A representative logic table is set forth below:

| Functions | Inputs | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | A0 | A1 | T |
| Controller OK | | | X | | | | | | | | | | | | | | | | | | |
| Preheat | | | X | | | | | | | | | | | | | | | | | | T6 |
| Start | | | | X | | | | O | O | | | | O | | | | | | X | | |
| Run | | | X | X | | O | | | | | | | | | | | | | | | |
| | | | X | O | X | O | | | | | | | | | | | | | | | |
| Lower | | | X | | | | | O | O | O | O | O | X | | | | | | | | |
| (Disabled) | | | X | | | | | O | O | X | O | O | X | | | | | | | | |
| (Enabled) | | | X | | | | | O | X | O | O | O | X | | | | | | | | |
| Lower/Mow | | | X | | | | | O | X | X | X | O | X | | | | | | | | T1 |
| | | | X | | | | | O | X | X | X | O | X | | | | | | | | T2 |
| Mow | | | X | | | | | O | X | X | X | O | M | | | | | | | | |
| Raise (Transport) | | | X | | | | | X | O | | O | O | O | | | | | | | | |
| (To turn around) | | | X | | | | | X | X | X | O | O | O | | | | | | | | T3 |
| | | | X | | | | | X | X | X | O | O | O | | | | | | | | |
| | | | X | | | | | X | X | O | O | O | O | | | | | | | | |
| Backlap front | | | X | X | | | | O | X | X | X | O | X | | | | | | | | T2 |
| | | | X | X | | | | O | X | X | X | O | X | | | | | | | | |
| Backlap Rear | | | X | X | | | | O | X | X | X | X | X | | | | | | | | T2 |
| | | | X | X | | | | O | X | X | X | X | X | | | | | | | | |

TIMERS
T1 = .5 sec.
T2 = 5.0 sec.
T3 = .9 sec.
T4 = .1 sec.

T5 = .9 sec.
T6 = 15 sec.
Key:
0 =
1 =
2 = Key Run
3 = Traction neutral
4 = Seat Switch
5 = High Coolant Temp
6 =
7 = Raise
8 = Enable
9 = Front Unit Down
10 = Backlap front
11 = Backlap rear
12 = Lower/mow
13 =
14 =
15 =
16 =
17 =
A0 = Start, key
A1 = DDDDDDDDDDDDDDD
T = Timer involved
X = Closed,
O = Open,
P = On,
M = Momentarily Closes,
A = Output on if reels previously were running.

|  | Outputs | | | | | | | | | | | | | |
|---|---|---|---|---|---|---|---|---|---|---|---|---|---|---|
| Functions | 0 | 1 | 2 | 3 | 4 | 5 | 6 | 7 | 8 | 9 | 10 | 11 | 12 | 13 |
| Controller OK | P | | | | | | | | | | | | | |
| Preheat | P | | | | | | | | | | | | | P |
| Start | P | | | | | | | | | | | | P | P |
| Run | P | | | | | | | P | | | | | | |
|  | P | | | | | | | P | | | | | | |
| Lower | P | | P | | | | P | | | | | | | |
| (Disabled) | P | | P | P | P | P | | | | | | | | |
| (Enabled) | P | | P | P | | P | | | | | | | | |
| Lower/Mow | P | | P | P | | P | | P | P | P | | | | |
|  | P | P | P | P | P | P | | P | P | P | | | | |
| Mow | P | P | | | | | | P | P | P | | | | |
| Raise (Transport) | P | | P | P | P | | | | | P | | | | |
| (To turn around) | P | A | P | P | | | | | A | P | | | | |
|  | P | | P | P | P | | | | | P | | | | |
|  | P | | | P | P | | | | | P | | | | |
|  | P | | | | | | | | | | | | | |
| Backlap front | P | P | | P | P | P | P | | P | | P | | | |
|  | P | P | | | | | | | P | | P | | | |
| Backlap Rear | P | P | P | P | P | P | P | | P | P | | | | |
|  | P | P | P | | | | | | | P | | | | |

Key:
0 = Diagnostic Light
1 = S8, S9
2 = S2
3 = S3
4 = S4
5 = S5
6 = S6
7 = ETR Hold/Alt
8 = VS1
9 = VS2
10 = S1
11 = S7
12 = Start
13 = Preheat
X = Closed,
O = Open,
P = On,
M = Momentarily Closes,
A = Output on if reels previously were running At block 206, first, the output states are qualified based upon the various input states. Additionally, the transmission speed is enabled if the operator has adjusted the controls 20 to a position other than neutral. At block 207 the change clip subroutine is run, first determining whether back lap of the reels is desired by the operator. If back lap is requested, both the height of cut selector 114 as set by the operator and the set point are determined.

If back lap is not requested the processor proceeds to block 208 and the set point subroutine is called. If 5 blade reels are being utilized, the ground speed is determined by interrupt driven routines based on high speed input devices measuring the rotation of a transmission gear driving wheels 16. Thus, the actual ground speed of the vehicle 10 may be used to vary the reel speed and optimize the clip. Given the determined ground speed, the set point is determined in accordance with a look-up table which includes the information set forth in Table 1 discussed above.

If a 5 blade reel is not being used, then the ground speed is determined via the high speed input interrupt driven routine and the set point is determined based on the 8 blade information.

Moving to block 209, microprocessor 102 determines whether the reels are qualified to run by the logic table set forth above. Next, the speed calculation subroutine is called to determine the proper reel speed given the HOC and ground speed. Microprocessor 102 then proceeds to block 210 where it is determined whether a change in the reel speed is necessary. If no change is necessary, then the high speed output does not need to be changed and the microprocessor proceeds to block 213. However, if a change is necessary, then microprocessor 102 proceeds to block 211 to check for valid speed data (i.e., the data is invalid if it is too old or is zero). If the speed data is not valid then it is assumed that the reels have stopped and the microprocessor 102 increases the duty cycle to the flow control valves 702, 706. If the speed data is valid, microprocessor 102 uses the data at block 212 to adjust the KI, KP and KD PID control values. As noted above, the reel speed is clamped between two predetermined values which in the preferred embodiment are 600 r.p.m. and 1800 r.p.m. However, those skilled in the art will appreciate that the foregoing numbers may vary and the clamping of the reel speeds may be determined by the speed required to cut the turf, to rid itself of the clippings and to avoid creating stragglers. Also, although the high end r.p.m. is limited by the controller 100, the system is also limited by the design of the hydraulic system 80.

The output is based upon the control equation as follows:

$$\text{PWM On Time} = \text{Error}/K_p + \text{Change Error}/K_d + \Sigma \text{Error}/K_i$$

The PID computations to set the pulse width modulator on time is determined at block 212. The microprocessor 212 then proceeds to block 213, where fault data from the outputs is determined, qualified outputs are turned on if they have not faulted or been masked, and the diagnostic light is flashed if any outputs have faulted (the light is initially turned on to show that the unit is turned on). If the operator has activated a control 20 to turn off the vehicle 10, then the processor 102 proceeds to block 214, otherwise the processor proceeds to block 203 to begin the main program loop once again.

It is to be understood that even though numerous characteristics and advantages of the present invention have been set forth in the foregoing description, together with details of the structure and function of the invention, the disclosure is illustrative only and changes may be made in detail, especially in the control process algorithm, in the reel drive system and in the coding of the monitored parameters. For example with regard to the latter, the coding might take the form of several bits to monitor additional characteristics. Further, each bit may not represent a specific monitored parameter, but a code might be implemented. Finally, an area of RAM in the first controller 100 might be used or a communication port other than an RS-232 port might be used. Also, the reel speed of one or several of the reels included on the turf maintenance vehicle might be monitored. Other modifications and alterations are well within the knowledge of those skilled in the art and are to be included within the broad scope of the appended claims.

What is claimed is:

1. A diagnostics device for a turf maintenance vehicle, of the type having an engine, a transmission, a cutting unit, and a plurality of operating parameters, comprising:

a. a first processor for actively controlling the operation of the turf maintenance vehicle, wherein said first processor monitors a plurality of predetermined operating parameters of the turf maintenance vehicle, each of said operating parameters having a status and wherein said operating parameters include an operator presence signal, a transmission status signal, and a cutting unit status signal, and wherein said first processor enables the operation of the engine and cutting unit of the turf maintenance vehicle based upon the status of the operating parameters by generating and outputting control signals to the engine and cutting unit; b. status signal generation means for generating a signal which includes components which are indicative of the status of each of said operating parameters;

c. a second processor for receiving said generated signal, and memory array means, cooperatively connected to said second processor, for storing said generated signal in a memory location in a manner which preserves the real time sequence and relationship of the status of the parameters, wherein subsequent analysis of the status of the parameters is facilitated and wherein each of said operating parameters received by said second processor is monitored by said first processor; and d. diagnostic tool means, cooperatively connected to said memory array means and said second processor, for visually displaying said generated signal, and wherein said diagnostic tool means displays the actual status of each of the parameters.

2. The diagnostics device of claim 1, wherein said diagnostic tool means is a remote computer.

3. The diagnostics device of claim 2, wherein said remote computer includes means for reviewing the status of the monitored parameters in a manner which provides for recreating the time sequence and relationship of the status of the monitored parameters.

4. The diagnostics device of claim 1, wherein said diagnostics tool means is a handheld device comprising:

a. decoder means for decoding said generated signal in real time into said components corresponding to the parameters which are monitored; and b. indicator means, connected to said decoder means, for applying said decoded components to an indicator which is visually perceivable, wherein the status of each of the monitored parameters is discernable in real time.

5. The diagnostics device of claim 1, wherein said generated signal is a digital signal comprised of one or more segments, wherein each segment includes a plurality of discrete bits of information, and wherein each bit of information provides an indication of the status of one of the parameters on a one-to-one basis.

6. The diagnostics device of claim 5, wherein said diagnostics tool means is a handheld device comprising:

a. decoder means for decoding said segments and multiple bits into said components corresponding to the status of the monitored parameters; and b. indicator means, connected to said decoder means, for applying said decoded components to an indicator, wherein the actual status of the monitored parameters may be visually discerned.

7. The diagnostics device of claim 1, wherein said memory array means includes a micro-controller having a communications port for receiving said generated signal, a memory storage device for storing said signal, and a microprocessor for controlling receipt of said signal and storing said signal in said memory storage device.

8. A diagnostics system for determining fault conditions by collecting the status of parameters monitored by an active control device on-board a turf maintenance vehicle, of the type wherein the control device produces control signals based on the status of the parameters and outputs the control signals to devices on the turf maintenance vehicle for allowing and disallowing operating functions of the turf maintenance vehicle, comprising:

a. parameter status means for generating a signal indicative of the logical operation of predetermined parameters monitored by the active control device located on-board the vehicle, wherein said parameters include cutting unit functions, engine and transmission status and operator presence, and wherein said generated signal contains the actual status of each of said parameters; and b. display means for receiving said generated signal and visually displaying said parameter status, wherein a fault condition is directly determinable from said display means, wherein presupposition of all possible errors is not required.

9. The diagnostic system of claim 8, wherein said display means receives and displays said signal in real time, and wherein said display means is comprised of at least one of a remote computer and a logical decoder means including a plurality of LEDs.

10. The diagnostic system of claim 9, wherein said remote computer decodes said generated signal and displays the status of each monitored parameter on a visual display.

11. The diagnostic system of claim 8, wherein said signal is stored in a memory array in manner which preserves the real time sequence relationship of the said parameters in order to enable recreation of the real time operation of the monitored parameters, and wherein said visual display means includes means to retrieve said stored signal.

12. The diagnostic system of claim 8, wherein said parameter status means generate said signal when a parameter changes condition.

13. The diagnostic system of claim 8, wherein said generated signal is a digital signal which includes a timing character and a plurality of discrete bits, wherein the status of each bit corresponds to the status of an individual monitored parameter.

14. The diagnostic system of claim 8, wherein said display means further comprises a hand held device including:

a. decoder means for decoding said generated signal into said components corresponding to the status of the monitored parameters; and b. indicator means, connected to said decoder means, for applying said decoded components to indicator which is visually perceivable, wherein the status of each of the monitored parameters may be reviewed by a user.

15. The diagnostic system of claim 8, wherein said signal is stored in a memory array in a predetermined manner to enable recreation of the real time operation of the monitored parameters, wherein said visual display means includes means to retrieve said stored signal, said signal is generated when a parameter changes condition, and said signal includes a timing character and a plurality of discrete bits, wherein the status of each bit corresponds to the status of an individual monitored parameter.

16. The diagnostic system of claim 15, wherein said memory array comprises a microprocessor which is arranged and configured for storing said signal in a predetermined area in a memory storage device and for responding to requests from said visual display means to transmit said signal.

17. The diagnostic system of claim 8, wherein said parameters includes inputs and computed outputs.

18. An electronic controller device for a turf maintenance vehicle, comprising:

a. a plurality of sensors to monitor a plurality of statuses of predetermined operative condition parameters of the vehicle and to generate first signals indicative of said condition wherein said first signals comprise a logical condition of said statuses relative to one another; and b. a microprocessor for monitoring said first signals and comparing the logical condition of said first signals to a look-up table prior to allowing subsequent operation of the vehicle, wherein said microprocessor actively generates and outputs at least one signal to a device on the turf maintenance vehicle.

19. The controller device of claim 18, wherein said microprocessor generates a second signal indicative of said statuses, wherein said second signal is a digital signal, and wherein said second signal can be analyzed upon the occurrence of a fault to determine which parameter exhibited the fault condition.

20. The controller device of claim 19, further comprising memory array means, cooperatively connected to said microprocessor, for receiving said second signal and for storing said second signal, wherein subsequent analysis of said statuses for a fault condition is facilitated.

21. The controller device of claim 20, further comprising communication port means, cooperatively connected to said memory array means, for transmitting said generated signal in a manner suitable for receipt by a diagnostic tool in order to display the actual parameter status over time.

22. The controller device of claim 21, wherein said second signal is generated when a parameter changes condition, and said signal includes a timing character and a plurality of discrete bits, wherein the status of each bit corresponds to the status of an individual monitored parameter.

23. The controller device of claim 21, wherein said communication port means and said memory array means are fabricated in a single micro-controller integrated circuit chip.

* * * * *